United States Patent
Son

(10) Patent No.: US 12,249,756 B2
(45) Date of Patent: *Mar. 11, 2025

(54) ELECTRONIC DEVICE AND METHOD COMPRISING ANTENNA

(71) Applicant: Samsung Electronics Co., Ltd., Suwon-si (KR)

(72) Inventor: Dongil Son, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 15 days.

This patent is subject to a terminal disclaimer.

(21) Appl. No.: 18/227,221

(22) Filed: Jul. 27, 2023

(65) Prior Publication Data

US 2023/0369746 A1    Nov. 16, 2023

Related U.S. Application Data

(63) Continuation of application No. 17/445,863, filed on Aug. 25, 2021, now Pat. No. 11,749,879, which is a
(Continued)

(30) Foreign Application Priority Data

May 16, 2018   (KR) .................. 10-2018-0055708

(51) Int. Cl.
  *H01Q 1/24*   (2006.01)
  *H01Q 1/38*   (2006.01)
  (Continued)

(52) U.S. Cl.
  CPC ............... *H01Q 1/243* (2013.01); *H01Q 1/38* (2013.01); *H01Q 21/065* (2013.01); *H04B 1/40* (2013.01); *H04M 1/0277* (2013.01)

(58) Field of Classification Search
  CPC ........ H01Q 1/243; H01Q 1/38; H01Q 21/065; H01Q 3/24; H01Q 5/307; H01Q 21/061;
  (Continued)

(56) References Cited

U.S. PATENT DOCUMENTS 8,750,919 B2   6/2014   Hwang
9,343,817 B2   5/2016   Pan
(Continued)

FOREIGN PATENT DOCUMENTS

EP          2975695 A1    1/2016
KR   10-2003-0038799 A    5/2003
(Continued)

OTHER PUBLICATIONS

International Search Report and Written Opinion of the International Searching Authority in connection with International Application No. PCT/KR2019/005864 dated Sep. 9, 2019, 10 pages.
(Continued)

*Primary Examiner* — David E Lotter

(57) ABSTRACT

Disclosed is an electronic device comprising a housing, a display, an antenna structure and at least one wireless communication circuit. The at least one wireless communication circuit is configured so as to transmit and/or receive a signal having a frequency between 3 GHz and 100 GHz, and may be configured so as to transmit and/or receive, in a first operation, a first signal having a first frequency by using not all but at least one conductive plate among a plurality of first conductive plates and a plurality of second conductive plates, and transmit and/or receive, in a second operation, a second signal having a second frequency differing from the first frequency by using not all but at least one conductive plate among the plurality of second conductive plates and the plurality of first conductive plates. In addition, various embodiments are possible as identified in the specification.

19 Claims, 20 Drawing Sheets

Related U.S. Application Data continuation of application No. 17/055,940, filed as application No. PCT/KR2019/005864 on May 16, 2019, now Pat. No. 11,367,945.

(51) Int. Cl.
*H01Q 21/06* (2006.01)
*H04B 1/40* (2015.01)
*H04M 1/02* (2006.01)

(58) Field of Classification Search
CPC .......... H01Q 21/28; H01Q 21/00; H04B 1/40; H04B 1/006; H04M 1/0277; H04M 1/026; H04M 1/0249; H04M 1/0266
See application file for complete search history.

(56) References Cited

U.S. PATENT DOCUMENTS

| | | | |
|---|---|---|---|
| 9,564,683 | B2 | 2/2017 | Won |
| 10,658,762 | B2 | 5/2020 | Paulotto et al. |
| 11,367,945 | B2* | 6/2022 | Son ..................... H04M 1/0277 |
| 11,469,516 | B2 | 10/2022 | Gonzalez et al. |
| 11,749,879 | B2* | 9/2023 | Son ......................... H01Q 3/24 |
| | | | 343/702 |
| 2012/0235881 | A1 | 9/2012 | Pan et al. |
| 2013/0050056 | A1 | 2/2013 | Lee et al. |
| 2014/0071018 | A1 | 3/2014 | Pan |
| 2014/0145879 | A1 | 5/2014 | Pan |
| 2015/0070228 | A1* | 3/2015 | Gu ......................... H01Q 25/00 |
| | | | 343/727 |
| 2017/0250460 | A1 | 8/2017 | Shin et al. |
| 2019/0245262 | A1* | 8/2019 | Xia ......................... H01Q 21/28 |
| 2019/0260110 | A1 | 8/2019 | Thai et al. |
| 2020/0091608 | A1 | 3/2020 | Alpman et al. |

FOREIGN PATENT DOCUMENTS

| | | |
|---|---|---|
| KR | 10-2009-0124042 A | 12/2009 |
| KR | 10-2010-0116278 A | 11/2010 |
| KR | 20110003629 A | 1/2011 |
| KR | 10-2013-0122688 A | 11/2013 |
| KR | 10-2014-0130785 A | 11/2014 |
| KR | 10-2017-0100972 A | 9/2017 |
| KR | 10-2019-0089955 A | 7/2019 |
| KR | 10-2020-0013760 A | 2/2020 |
| KR | 10-2020-0113186 A | 10/2020 |

OTHER PUBLICATIONS

Korean Intellectual Property Office, "Notification of Reason for Refusal" issued Mar. 16, 2022, in connection with Korean Patent Application No. 10-2018-0055708, 15 pages.

Written Decision on Registration dated Sep. 29, 2022 in connection with Korean Patent Application No. 10-2018-0055708, 10 pages.

* cited by examiner

ELECTRONIC DEVICE AND METHOD COMPRISING ANTENNA

CROSS-REFERENCE TO RELATED APPLICATIONS

This application is a continuation of application Ser. No. 17/445,863, filed Aug. 25, 2021, which is a continuation of application Ser. No. 17/055,940, now U.S. Pat. No. 11,367,945, which is a 371 National Stage of International Application No. PCT/KR2019/005864, filed May 16, 2019, which claims priority to Korean Patent Application No. 10-2018-0055708, filed May 16, 2018, the disclosures of which are herein incorporated by reference in their entirety.

BACKGROUND

1. Field

Various embodiments of this specification refer to an electronic device including an antenna and a method thereof.

2. Description of Related Art

For the purpose of satisfying a demand on a wireless data traffic increasing after commercialization of $4^{th}$ generation (4G) communications, there is a study of a communication system (e.g., a $5^{th}$ generation (5G) communication system, a pre-5G communication system, or a new radio (NR)) that transmits/receives a signal by using a frequency of a millimeter wave (mmWave) band (e.g., ranging from 3 GHz to 300 GHz).

SUMMARY

An electronic device may include a plurality of communication devices (e.g., an antenna module) for transmitting/receiving a signal in the mmWave band. The plurality of communication devices may also support different frequency bands. For example, the electronic device may include at least one communication device for radiating a signal in a first frequency band and at least one communication device for radiating a signal in a second frequency band.

Due to the high directivity of the mmWave signal, there may be a plurality of communication devices for omnidirectional radiation for each frequency band. As the number of communication devices increases to support multiple frequency bands, a space in the housing of the electronic device may decrease.

According to various embodiments of this specification, an electronic device may include at least one communication device capable of radiating signals in a plurality of frequency bands toward a plurality of planes.

According to various embodiments, an electronic device may include a housing including a first plate, a second plate facing away from the first plate, and a side member surrounding a space between the first plate and the second plate, a display viewable through a part of the first plate and positioned in the housing, and an antenna structure positioned in the housing. The antenna structure may include a first planar structure including a periphery facing a first direction toward the second plate and extending along a first portion of the side member when viewed from above the second plate, and including a plurality of first conductive plates formed in the first planar structure or on the first planar structure, and a second planar structure including a plurality of second conductive plates facing a second direction toward the first portion of the side member, and formed in or on the second planar structure. The electronic device may further include at least one wireless communication circuit electrically connected to the antenna structure, the plurality of first conductive plates, and the plurality of second conductive plates and configured to transmit and/or receive a signal having a frequency between 3 GHz and 100 GHz. The at least one wireless communication circuit may be configured to transmit and/or receive a first signal having a first frequency, using the plurality of first conductive plates and at least one, but not all, of the plurality of second conductive plates, in a first operation; the at least one wireless communication circuit may be configured to transmit and/or receive a second signal having a second frequency different from the first frequency, using the plurality of second conductive plates and at least one, but not all, of the plurality of first conductive plates, in a second operation.

According to various embodiments, an electronic device may include housing, a display viewable from the front surface of the electronic device and at least partially accommodated inside the housing, a first antenna set including a first antenna and a second antenna, facing a first side surface of the electronic device, and at least partially accommodated inside the housing, a second antenna set including a fourth antenna and a third antenna positioned closer to the second antenna than the fourth antenna, facing a second side surface of the electronic device substantially perpendicular to the first side surface, and at least partially accommodated inside the housing, and at least one wireless communication circuit electrically connected to the first antenna set and the second antenna set. According to an embodiment, in a first operation, at least one wireless communication circuit may transmit and/or receive a first signal having a first frequency, using the first antenna, the second antenna, and the third antenna, excluding the fourth antenna; in a second operation, at least one wireless communication circuit may transmit and/or receive a second signal having a second frequency different from the first frequency, using the second antenna, the third antenna, and the fourth antenna excluding the first antenna.

According to various embodiments, an electronic device may include a housing forming an exterior of the electronic device, and including a front surface, a back surface facing away from the front surface, and a side surface at least partially surrounding a space between the front surface and the back surface, and a communication device including a first antenna array for radiating a signal toward the back surface inside the housing, and a second antenna array for radiating a signal toward the side surface. The first antenna array may include a plurality of first antenna elements, and the second antenna array may include a plurality of second antenna elements. The communication device may be configured to radiate a signal in a first frequency band, using the plurality of first antenna elements and at least one second antenna element of the plurality of second antenna elements, and to radiate a signal in a second frequency band, using the plurality of second antenna elements and at least one first antenna element of the plurality of first antenna elements.

According to various embodiments disclosed in this specification, an available space in the housing of an electronic device may be increased by using a communication device capable of radiating signals in a plurality of frequency bands toward a plurality of planes.

According to various embodiments disclosed in this specification, the communication device may increase the coverage of an electronic device by radiating a signal in mmWave band toward a plurality of planes.

Besides, a variety of effects directly/indirectly understood through the specification may be provided.

With regard to description of drawings, the same or similar components will be marked by the same or similar reference signs.

DETAILED DESCRIPTION

Hereinafter, various embodiments of the disclosure may be described with reference to accompanying drawings. However, it should be understood that this is not intended to limit the disclosure to specific implementation forms and includes various modifications, equivalents, and/or alternatives of embodiments of the disclosure.

Figure 1:
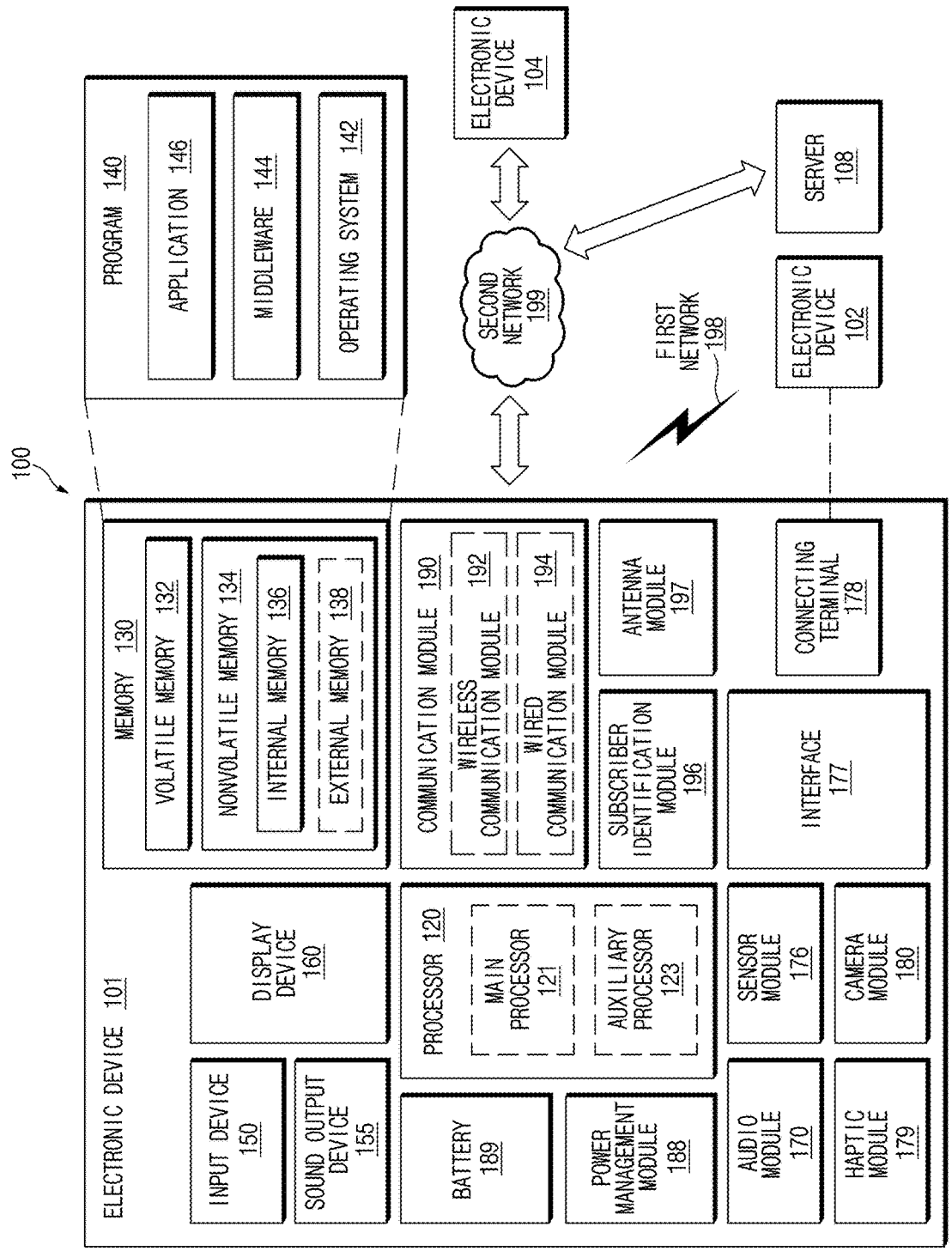
FIG. 1 illustrates a block diagram of an electronic device in a network environment according to various embodiments.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
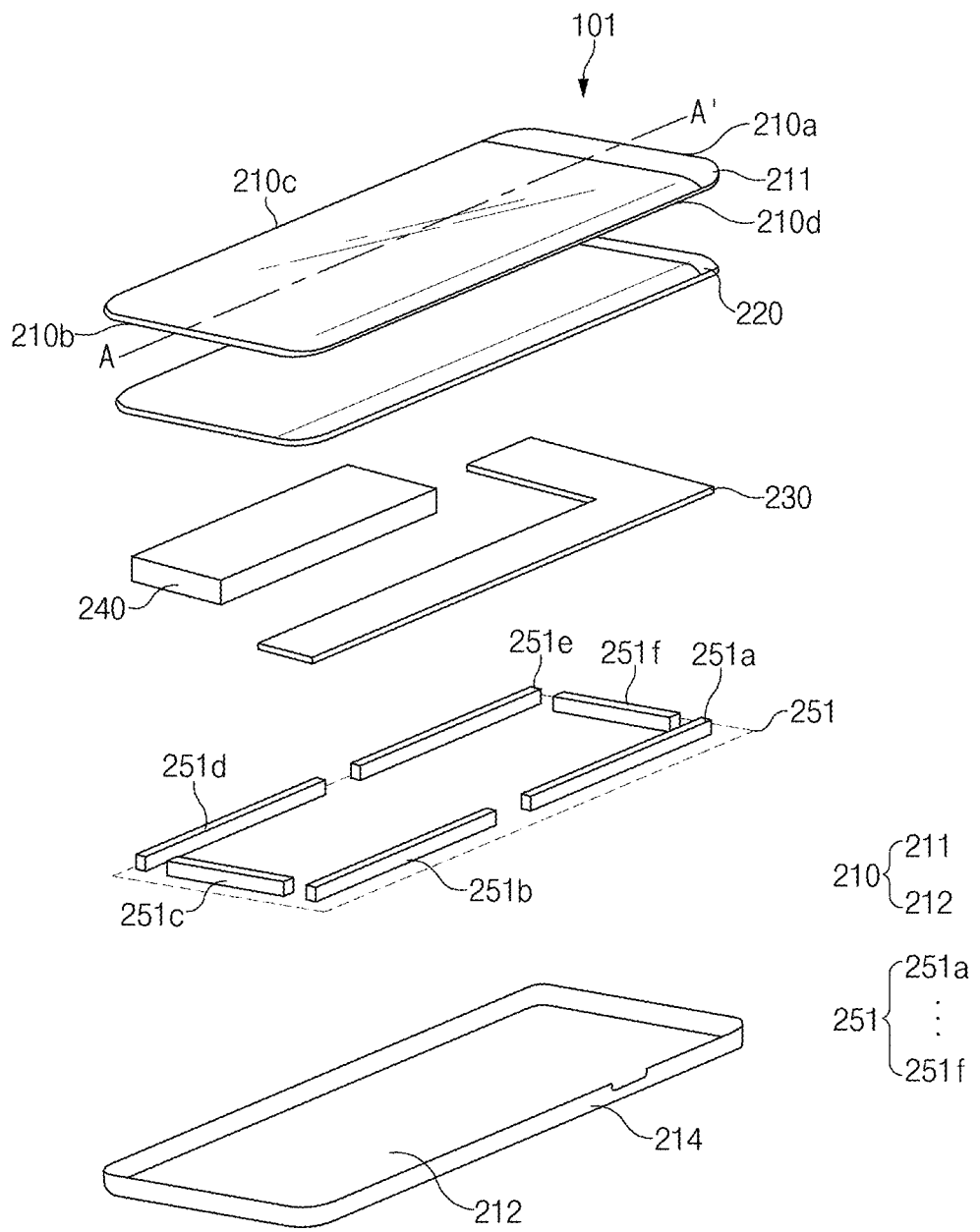
FIG. 2 illustrates an exploded perspective view of an electronic device according to various embodiments.

FIG. 2 illustrates an exploded perspective view of an electronic device according to various embodiments;

Referring to FIG. 2, the electronic device 101 (e.g., the electronic device 101 of FIG. 1) may include a cover glass 211, a back cover 212, a display 220, a printed circuit board (PCB) 230, a battery 240, or a communication device 251.

According to an embodiment, the cover glass 211 and the back cover 212 may be coupled with each other to form a housing 210 of the electronic device 101. The housing 210 may form the exterior of the electronic device 101, and may protect internal components of the electronic device 101 from external impact.

According to an embodiment, the housing 210 may include a front surface, a back surface facing away from the front surface, and a side surface surrounding a space between the front surface and the back surface. In an embodiment, the side surface may include a first side surface (e.g., a periphery region forming 210*a*, 210*b*, 210*c*, and 210*d*) and a second side surface 214.

According to an embodiment, a shape of the housing 210 may correspond to at least one of a rectangle, substantially a rectangle, a circle, or an ellipse, when viewed from the front surface. For example, the housing 210 may be in the shape of a rectangle or substantially a rectangle (e.g., a rectangle having a curved corner) including a first edge 210*a*, a second edge 210*b* opposite to the first edge 210*a*, a third edge 210*c* connecting one end of the first edge 210*a* and one end of the second edge 210*b*, and a fourth edge 210*d* connecting an opposite end of the first edge 210*a* and an opposite end of the second edge 210*b*, when viewed from the front surface. According to an embodiment, as illustrated in FIG. 2, the cover glass 211 may form a substantially flat front surface of the electronic device 101 and the first side surface extended from the front surface, and the back cover 212 may form the back surface of the electronic device 101 and the second side surface 214 extended from the back surface. According to another embodiment, the cover glass 211 may form a substantially flat front surface of the electronic device 101, and the back cover 212 may form the back surface and the side surface of the electronic device 101. In this case, according to an embodiment, the side surface may form a first portion (e.g., the second side surface 214) extended from the back surface and a second portion (e.g., the first side surface) extended from the first portion, and at least part of the second portion may be bent in a different direction from the first portion and may be coupled with the front surface.

According to an embodiment, at least part of the first side surface and the second side surface 214 may be formed of a conductor. For example, the conductor may include aluminum (Al), or a metal material such as stainless steel. In this case, at least part of the first side surface 213 and the second side surface 214 may be formed of a metal frame that is distinguished from the front surface and the back surface of the housing 210, for example. For example, the housing 210 may include the cover glass 211 corresponding to the front surface, the back cover 212 corresponding to the back surface, and the metal frame corresponding to the side surface.

According to an embodiment, at least part of the cover glass 211 and the back cover 212 may be formed of a dielectric having permittivity of a specified magnitude. For example, the permittivity of the dielectric forming the cover glass 211 and the permittivity of the dielectric forming the back cover 212 may be the same, or may be at least partially different.

According to an embodiment, the display 220 (e.g., the display device 160 of FIG. 1) may be interposed between the cover glass 211 and the back cover 212. The display 220 may be electrically connected with the printed circuit board 230, and may output content (e.g., a text, an image, a video, an icon, a widget, or a symbol) or may receive a touch input (e.g., a touch, a gesture, or a hovering) from the user.

According to an embodiment, various electronic parts, elements, or printed circuits of the electronic device 101 may be mounted on the printed circuit board 230. For example, an application processor (AP) (e.g., the processor 120 of FIG. 1), a communication processor (CP) (e.g., the processor 120 of FIG. 1), or a memory (e.g., the memory 130 of FIG. 1) may be mounted on the printed circuit board 230. In various embodiments of the disclosure, the printed circuit board 230 may be referred to as a "first PCB", a "main PCB", a "main board", or a "printed board assembly (PBA)".

According to an embodiment, the battery 240 (e.g., the battery 189 of FIG. 1) may convert chemical energy and electrical energy bidirectionally. For example, the battery 240 may convert chemical energy into electrical energy and may supply the converted electrical energy to the display 220 and various components or modules mounted on the printed circuit board 230. For another example, the battery 240 may convert and store electrical energy supplied from the outside to chemical energy. According to an embodiment, the printed circuit board 230 may include a power management module (e.g., the power management module 188 of FIG. 1) for managing the charging and discharging of the battery 240.

According to an embodiment, the communication device 251 may be interposed between the display 220 and the back cover 212. According to an embodiment, the communication device 251 may mean a module that includes at least one antenna array for radiating a signal in a high frequency band (e.g., ranging from 3 GHz to 300 GHz). Detailed components included in the communication device 251 will be described with reference to FIG. 4. For example, each of a plurality of communication devices 251a, 251b, 251c, 251d, 251e, and 251f may be referred to as the "communication device 251". According to an embodiment, at least part of the plurality of communication devices 251a, 251b, 251c, 251d, 251e, and 251f may be positioned by the side of the printed circuit board 230 or may be interposed between the printed circuit board 230 and the back cover 212. According to an embodiment, at least part of the plurality of communication devices 251a, 251b, 251c, 251d, 251e, and 251f may be attached to the back cover 212 by a coupling means (e.g., an adhesive or a fastening structure (e.g., a bolt and nut)).

The number, shape, and arrangement of the communication devices 251a, 251b, 251c, 251d, 251e, and 251f are not limited to an example illustrated in FIG. 2, and an embodiment associated with the number, shape, and arrangement of the communication devices 251a, 251b, 251c, 251d, 251e, and 251f will be described with reference to FIGS. 3 to 5.

According to an embodiment, the electronic device 101 may further include a communication module (not illustrated) (e.g., the communication module 190 of FIG. 1) on the printed circuit board 230. The communication module may include a baseband processor (BP), a radio frequency integrated circuit (RFIC), or an intermediate frequency integrated circuit (IFIC). According to an embodiment, the communication module may be electrically connected with the communication device 251 and may feed a power into the communication device 251. In various embodiments of the disclosure, the term "feed" may mean an operation in which the communication module applies a current to the communication device 251. In an embodiment, the communication module may communicate with an external device (e.g., the electronic device 102, the electronic device 104, or the server 108 of FIG. 1) through a millimeter wave signal by feeding a power to the communication device 251. The millimeter wave signal may be understood, for example, as a signal, the wavelength of which is a millimeter unit, or a signal having a frequency of a band ranging from 20 GHz to 100 GHz.

Figure 3:
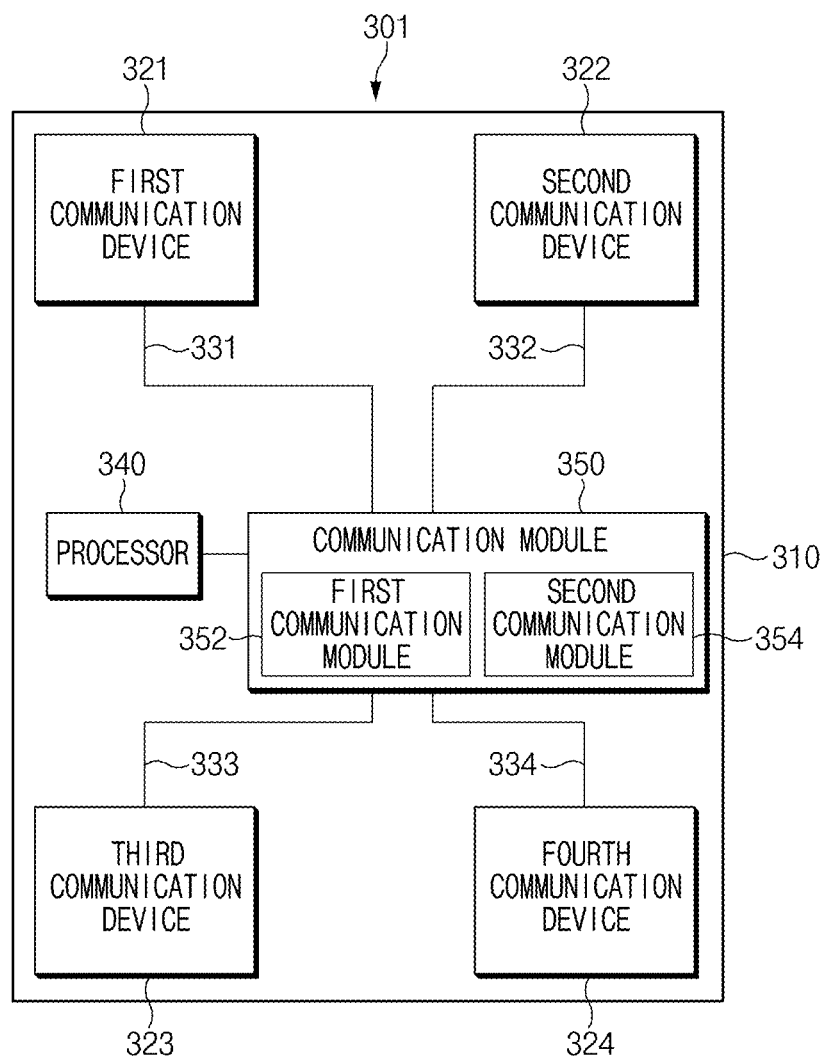
FIG. 3 illustrates a block diagram of a communication system supporting 5th generation (5G) communication according to various embodiments.

FIG. 3 illustrates a block diagram of an electronic device 301 supporting 5th generation (5G) communication according to various embodiments.

Referring to FIG. 3, the electronic device 301 (e.g., the electronic device 101 of FIG. 2) may include a housing 310 (e.g., the housing 210 of FIG. 2), a processor 340 (e.g., the processor 120 of FIG. 1), a communication module 350 (e.g., the communication module 190 of FIG. 1), a first communication device 321, a second communication device 322, a third communication device 323, a fourth communication device 324 (hereinafter at least one of the communication devices 251a, 251b, 251c, 251d, 251e, and 251f of FIG. 2), a first conductive line 331, a second conductive line 332, a third conductive line 333, and/or a fourth conductive line 334.

According to an embodiment, the housing 310 may protect any other components of the electronic device 301. For example, the housing 310 may include a front plate (e.g., the first plate), a back plate (e.g., the second plate) facing away from the front plate, and a side member (or a metal frame) surrounding a space between the front plate and the back plate. The side member may be attached to the back plate or may be integrally formed with the back plate. For example, a display (e.g., the display 220 of FIG. 2) may be exposed through a portion of the front plate and may be positioned in the housing 310.

According to an embodiment, the electronic device 301 may include at least one of the first communication device 321, the second communication device 322, the third communication device 323, or the fourth communication device 324. For example, a communication device may be referred to as an "antenna structure".

According to an embodiment, the processor 340 may include one or more of a central processing unit, an application processor (AP), a graphic processing unit (GPU), an image signal processor of a camera, or a baseband processor (BP) (or a communication processor (CP)). According to an embodiment, the processor 340 may be implemented with a system on chip (SoC) or a system in package (SiP).

According to an embodiment, the communication module 350 may be electrically connected with at least one of the first communication device 321, the second communication device 322, the third communication device 323, or the fourth communication device 324 by using at least one of the first conductive line 331, the second conductive line 332, the third conductive line 333, or the fourth conductive line 334. For example, the communication module 350 may be electrically connected with the first communication device 321, the second communication device 322, the third communication device 323, and the fourth communication device 324 by using the first conductive line 331, the second conductive line 332, the third conductive line 333, and the fourth conductive line 334. The communication module 350 may include at least one of a BP, an RFIC, or an IFIC.

According to an embodiment, the communication module 350 may include a processor (e.g., a BP) which is independent of the processor 340 (e.g., an AP). For example, in the case where the processor 340 includes an AP and the communication module 350 includes the BP, the electronic device 301 may further include the RFIC or an IFIC as a separate module (not illustrated). In this case, the RFIC or the IFIC may be electrically connected with the communication module 350, and the RFIC or the IFIC may be electrically connected with the first communication device 321, the second communication device 322, the third communication device 323, and the fourth communication device 324 by using the first conductive line 331, the second conductive line 332, the third conductive line 333, and the fourth conductive line 334. For another example, the BP and the RFIC or IFIC may be integrally formed with the one communication module 350. According to another embodiment, the processor 340 may include the AP and the BP, and the communication module 350 may include the IFIC or the RFIC.

The first conductive line 331, the second conductive line 332, the third conductive line 333, and/or the fourth conductive line 334 may include, for example, a coaxial cable and/or a flexible printed circuit board (FPCB).

According to an embodiment, the communication module 350 may include at least one of a first communication module 352 (e.g., a first BP) and a second communication module 354 (e.g., a second BP). The electronic device 301 may further include at least one interface (e.g., an inter processor communication channel) for supporting inter-chip communication between the first communication module 352 (e.g., the first BP) or the second communication module 354 (e.g., the second BP) and the processor 340. The processor 340 and the first communication module 352 or the second communication module 354 may transmit or receive data by using the at least one interface.

According to an embodiment, the first communication module 352 or the second communication module 354 may provide an interface for performing communication with any other entities. The first communication module 352 may support, for example, wireless communication with regard to a first network (not illustrated). The second communication module 354 may support, for example, wireless communication with regard to a second network (not illustrated).

According to an embodiment, the first communication module 352 or the second communication module 354 may form one module with the processor 340. For example, the first communication module 352 or the second communication module 354 may be integrally formed with the processor 340.

According to an embodiment, the communication module 350 may be implemented with a single communication module (e.g., a BP). For example, the communication module 350 may include one communication module capable of supporting wireless communication with regard to the first network and the second network.

For another example, the first communication module 352 or the second communication module 354 may be positioned within one chip or may be implemented in the form of an independent chip. According to an embodiment, the processor 340 and at least one BP (e.g., the first communication module 352) may be integrally formed in one chip (e.g., an SoC), and the other BP (e.g., the second communication module 354) may be implemented in the form of an independent chip.

According to an embodiment, the first to fourth communication devices 321, 322, 323, and 324 may up-convert or down-convert a frequency. For example, the first communication device 321 may up-convert an intermediate frequency (IF) signal received through the first conductive line 331. For another example, the first communication device 321 may down-convert an mmWave signal received through an antenna array (not illustrated), and may transmit the down-converted signal by using the first conductive line 331. According to an embodiment, through the first to fourth conductive lines 331, 332, 333, and 334, the first to fourth communication devices 321, 322, 323, and 324 may provide a signal directly to the processor 340 or may receive a signal directly from the processor 340. For example, the communication module 350 may be omitted or may be integrated in the processor 340.

For example, the operations of the communication module 350 described in the disclosure may be performed by the processor 340 and/or the first to fourth communication devices 321, 322, 323, and 324.

According to an embodiment, the first network (not illustrated) or the second network (not illustrated) may correspond to the network 199 of FIG. 1. According to an embodiment, the first network (not illustrated) and the second network (not illustrated) may include a 4G network and a 5G network, respectively. The 4G network may support a long term evolution (LTE) protocol or an LTE-advanced (LTE-A) protocol defined in the 3rd generation partnership project (3GPP). The 5G network may support, for example, a new radio (NR) protocol defined in the 3GPP.

Figure 4:
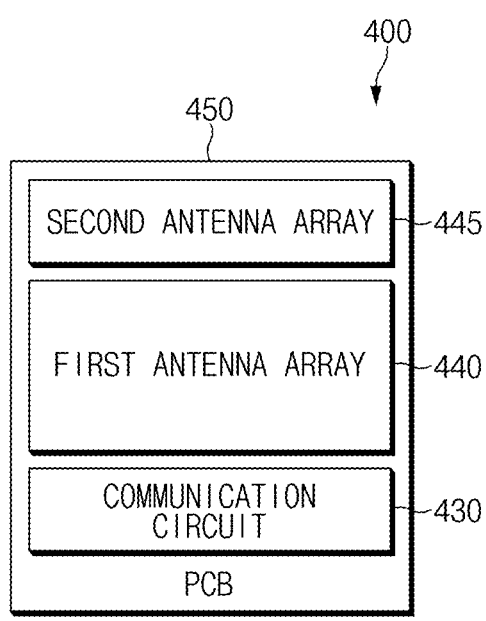
FIG. 4 illustrates block diagram of a communication device according to various embodiments.

FIG. 4 illustrates a block diagram of a communication device 400 according to various embodiments.

Referring to FIG. 4, the communication device 400 (e.g., the first communication device 321, the second communication device 322, the third communication device 323, or the fourth communication device 324 of FIG. 3) may include a printed circuit board (PCB) 450, a communication circuit 430 (e.g., an RFIC) positioned on the PCB 450, and one or more antenna arrays (e.g., a first antenna array 440 or a second antenna array 445) positioned on the PCB 450. The communication device 400 may be referred to as an "antenna module", an "antenna structure", or a "radio frequency antenna (RFA) module".

According to various embodiments, the PCB 450 may include a coaxial cable connector or a board to board (B-to-B) connector for electrical connection with any other PCB (e.g., a PCB on which the communication module 350 of FIG. 3 is disposed) by using a transmission line (e.g., the conductive line 331, 332, 333, or 334 of FIG. 3 and/or a coaxial cable). The PCB 450 may be connected to the PCB, on which the communication module 350 is positioned, for example, with a coaxial cable by using a coaxial connector, and the coaxial cable may be used to deliver a radio frequency (RF) signal or to transmit/receive an intermediate frequency (IF) signal. For another example, a power or any other control signal may be transmitted through the B-to-B connector.

According to various embodiments, the PCB 450 may have a bended shape. For example, the PCB 450 may be a rigid bended PCB or a curved PCB. For another example, the PCB 450 may be formed of a plurality of PCBs. The PCB 450 may include a plurality of PCBs connected through a flexible PCB (FPCB), a B-to-B connector, and/or a coaxial cable. According to an embodiment, the PCB 450 may include a first side and/or a second side. For example, the first side and/or the second side may not be parallel to each other. For example, the PCB 450 may be implemented such that the first side and/or the second side form a specified angle (e.g., about 10 degrees or more and less than about 170 degrees). According to an embodiment, when the communication device 400 is mounted inside a housing (e.g., the housing 210 of FIG. 2), the first side may be positioned to be adjacent to a back surface (e.g., the back plate 212) of the housing, and the second side may be positioned to be adjacent to the side surface 214 of the housing. According to an embodiment, the first side may be substantially perpendicular to the second side.

According to various embodiments, the communication circuit 430, the first antenna array 440, or the second antenna array 445 may be positioned on the PCB 450. According to an embodiment, the first antenna array 440 may be disposed on the first side of the PCB 450; the second antenna array 445 may be disposed on the second side of the PCB 450; the communication circuit 430 may be located on the opposing side of the first side. For example, the communication circuit 430 may be electrically connected to the first antenna array 440 and the second antenna array 445. According to an embodiment, the first antenna array 440 may be disposed on the first side of the PCB 450; the second antenna array 445 of the PCB 450 may be disposed on the second side of the PCB 450; the communication circuit 430 may be located on the opposing side of the second side. For example, the communication circuit 430 may be electrically connected to the first antenna array 440 and the second antenna array 445. According to an embodiment, the communication circuit 430 may include a plurality of communication circuits (e.g., the first communication circuit and the second communication circuit). For example, the first antenna array 440 may be disposed on the first side of the PCB 450; the second antenna array 445 may be disposed on the second side of the PCB 450; the first communication circuit may be arranged on the opposing side of the first side; the second communication circuit may be arranged on the opposing side of the second side. The first communication circuit may be electrically connected to the first antenna array 440. The second communication circuit may be electrically connected to the second antenna array 445.

According to an embodiment, the first antenna array 440 may include a plurality of first conductive plates (e.g., antenna elements). The second antenna array 445 may include a plurality of second conductive plates (e.g., antenna elements). Each of the first antenna array 440 and the second antenna array 445 may include at least one antenna element. The at least one antenna element may include at least one of a patch antenna, a shorted patch antenna, a loop antenna, or a dipole antenna.

According to an embodiment, the communication circuit 430 may support a radio frequency signal ranging from 3 GHz to 300 GHz. For example, the communication circuit 430 may support a radio frequency signal ranging from 24 GHz to 30 GHz and/or from 37 GHz to 40 GHz. According to an embodiment, the communication circuit 430 may up-convert or down-convert a frequency. For example, the communication circuit (e.g., the communication circuit 430 of FIG. 4) included in the first communication device 321 may up-convert an IF signal received from the communication module 350 (or a separate RFIC (not illustrated)) through the first conductive line 331. For another example, the communication circuit (e.g., the communication circuit 430 of FIG. 4) may down-convert a millimeter wave (mm-Wave) signal received through the first antenna array 440 or the second antenna array 445 included in the first communication device 321 and may transmit the down-converted signal to the communication module 350 by using the first conductive line 331.

According to various embodiments, the communication circuit 430 may be formed of a plurality of communication circuits. According to an embodiment, the communication circuit 430 may include a first communication circuit and a second communication circuit. The first communication circuit and the second communication circuit may be configured to control processing and/or transmitting/receiving signals in different frequency bands. For example, the first communication circuit may be configured to control processing and/or transmitting/receiving signals in the first frequency band; the second communication circuit may be configured to control processing and/or transmitting/receiving signals in a second frequency band different from the first frequency band. According to an embodiment, in the first frequency band and the second frequency band, at least one of the width of the frequency band or the center frequency may be different. For example, at least part of the first frequency band may not overlap with at least part of the second frequency band. For another example, the first frequency band may not overlap with the second frequency band. For another example, the first frequency band may include a frequency of 28 GHz, and the second frequency band may include a frequency of 39 GHz.

Figure 5:
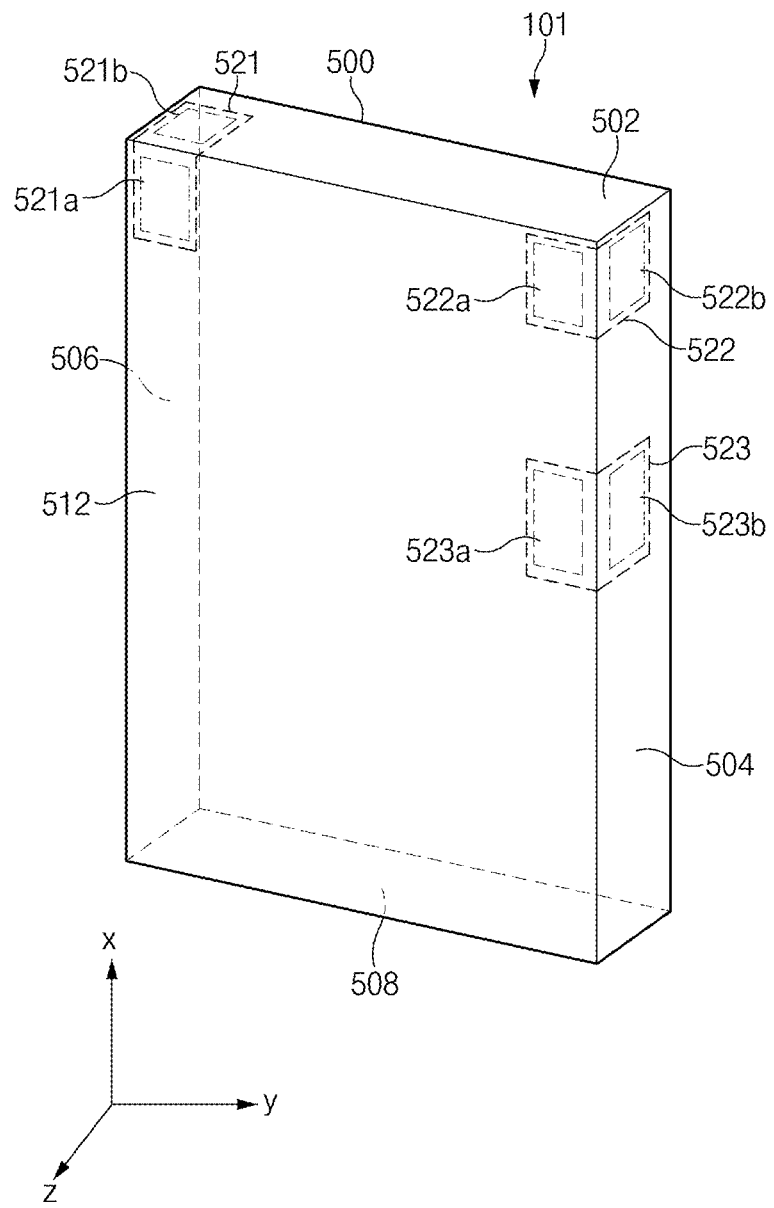
FIG. 5 is a perspective view of an electronic device including a plurality of communication devices according to various embodiments.

FIG. 5 is a perspective view of the electronic device 101 including a plurality of communication devices according to various embodiments.

Referring to FIG. 5, according to various embodiments, the electronic device 101 may include at least one of a plurality of communication devices 521, 522, and 523 mounted to form beams in various directions within housing 500 (e.g., the housing 310 of FIG. 3). According to an embodiment, at least one of the plurality of communication devices 521, 522, and 523 may include first antenna arrays 521a, 522a, and 523a that are disposed substantially parallel to a back plate 512 (e.g., the back cover 212 of FIG. 2) of the electronic device 101. For example, the first antenna arrays 521a, 522a, and 523a may be referred to as the first antenna array 440 of FIG. 4. According to an embodiment, at least one of the plurality of communication devices 521, 522, and 523 may include second antenna arrays 521b, 522b, and 523b that are disposed substantially parallel to a side member 501 (e.g., the side surface 214 of FIG. 2) of the electronic device 101. For example, the side member 501 may include a first side 502 with a first length, a second side 504 perpendicular to the first side 502 and having a second length, a third side 508 parallel to the first side 502, perpendicular to the second side 504, and having the first length, or a fourth side 506 perpendicular to the first side 502, parallel to the second side 504, and having the second length. For example, the second antenna arrays 521a, 522a, and 523a may be referred to as the "second antenna array 440" of FIG. 4. At least one of the plurality of communication devices 521, 522, and 523 may be formed as a planar structure or a non-planar structure.

For example, the first antenna array 521a included in the first communication device 521 may be mounted toward the back plate 512 on the left top of the back plate 512 when viewed from the back plate 512, and the second antenna array 521b may be mounted to face the first side 502 of the side member 501 adjacent to a side (e.g., the back plate 512) on which the first communication device 521 is mounted.

For example, the first antenna array 522a included in the second communication device 522 may be mounted toward the back plate 512 on the right top of the back plate 512, and the second antenna array 522b may be mounted to face the second side 504 of the side member 501.

For example, the first antenna array 523a included in the third communication device 523 may be mounted toward the right middle when viewed from the back plate 512, and the second antenna array 523b may be mounted toward the second side 502 of the side member 501.

The number, layout, and/or shapes of the communication devices 521, 522, and 523 illustrated in FIG. 5 are only an example, and the number, layout, and/or shapes of the communication devices 521, 522, and 523 that are mounted on the electronic device 101 may be variously changed.

Below, various examples of a communication device 600 will be described with reference to FIGS. 6A to 6E. In the following embodiments, the communication device 600 may be referred to by the communication device 400 of FIG. 4. For example, the communication device 600 may be called an "antenna module", an "antenna structure", or an "RFA module". For example, a first antenna array 640 may be referred to as the "first antenna array 440" of FIG. 4. A second antenna array 645 may be referred to as the "second antenna array 445" of FIG. 4. A PCB 650 may be referred to as the PCB 450 of FIG. 4. A communication circuit 630 may correspond to the communication circuit 430 of FIG. 4. According to an embodiment, the communication circuit 630 may include at least one of a first communication circuit 631 or a second communication circuit 632. Hereinafter, for convenience of description, it may be assumed that the communication device 600 of FIGS. 6A to 6E is mounted like the third communication device 523 of FIG. 5. For example, the first antenna array 640 and the second antenna array 645 may correspond to the first antenna array 523a and the second antenna array 523b of FIG. 5, respectively.

Figure 6A:
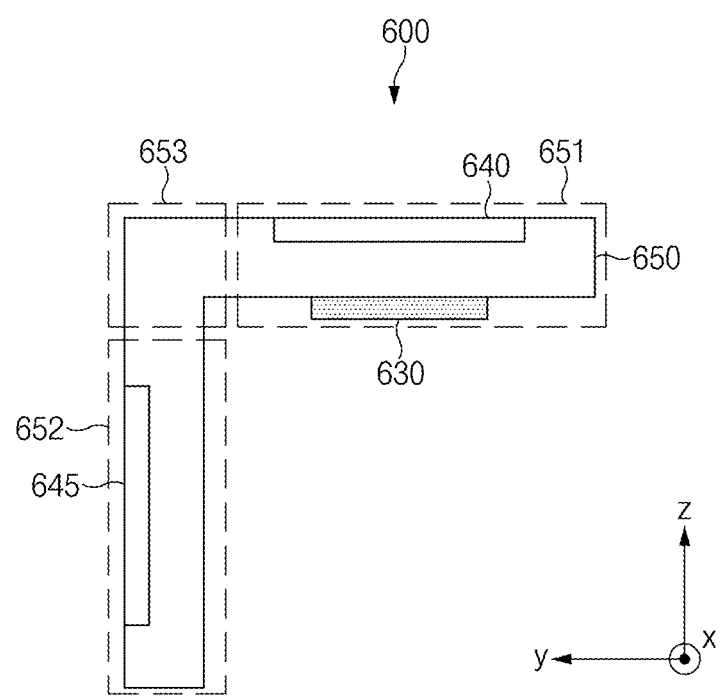
FIG. 6A illustrates an example of a communication device implemented as a single PCB according to various embodiments.

FIG. 6A illustrates an example of the communication device 600 implemented as a single PCB according to various embodiments.

Referring to FIG. 6A, according to various embodiments, the communication device 600 may be implemented by using the single PCB 650. For example, the PCB 650 may be a rigid bended PCB or a curved PCB. The PCB 650 may be generated by bending a planar PCB through a post-process (e.g., heat treatment, optical treatment, mechanical treatment, and/or chemical treatment). FIG. 6A illustrates that the PCB 650 is curved in a rectangular shape, but the PCB 650 is capable of being curved in a curved shape having one or more curvatures. According to an embodiment, the first antenna array 640 may be disposed on the first side (e.g., a side surface parallel to an X-Y plane and exposed to the outside of the communication device 600 in a +Z axis) of the PCB 650; the second antenna array 645 may be disposed on the second side (e.g., a side parallel to the X-Y plane and exposed to the outside of the communication device 600 in the −Z direction).

According to various embodiments, the PCB 650 may include a first portion 651, a second portion 652, and a periphery part 653. For example, the communication device 600 may correspond to the third communication device 523 of FIG. 5. Referring to FIGS. 5 and 6A, the first antenna array 523a of the communication device 523 may be accommodated in the housing 500 and may be disposed in a direction (e.g., a +Z axis direction) of the back plate 512 of the electronic device 101. For example, the first portion 651 including the first antenna array 640 of the communication device 600 of FIG. 6 may be disposed in the +Z axis direction. The first antenna array 523a of the communication device 523 has a curved portion bent along the side member 504. For example, when viewed in the −X-axis direction from above the third communication device 523 of FIG. 5, the third communication device 523 has the same shape as the communication device 600. One end of the first portion 651 of the communication device 600 may include the periphery part 653 extending along a portion of a side member (e.g., the second side 504 of FIG. 5). For example, the periphery part 653 may be bent along the shape of the side member 504. The communication device 600 may include the second portion 652 facing the second direction (e.g., +Y axis) of the side member 504. For example, the first portion 651 and the second portion 652 may be connected through the periphery part 653. For example, the first portion 651 of the PCB 650 and configurations (e.g., the communication circuit 630 and the first antenna array 640) included (e.g., mounted) in the first portion 651 may be referred to as a first planar structure. The second portion 652 of the PCB 650 and configurations (e.g., the second antenna array 645) included (e.g., mounted) in the second portion 652 may be referred to as a second planar structure. According to an embodiment, the first planar structure and the second planar structure may be generated from the single PCB 650. For example, the first planar structure may be curved from the second planar structure. According to an embodiment, the first planar structure and the second planar structure may be separate PCBs connected through the periphery part 653. For example, in the following embodiments, the first portion 651 may be referred to as a first PCB; the second portion 652 may be referred to as a second PCB; and the periphery part 653 may be referred to as a connection part.

According to various embodiments, the communication circuit 630 may be configured to transmit and/or receive a signal having a frequency between 3 GHz and 300 GHz. According to various embodiments, the communication circuit 630 may be configured to process, generate, and/or receive a first wireless signal having a center frequency in a first frequency band and a second wireless signal having a center frequency in a second frequency band. For example, the first frequency band may be a frequency band including a frequency of 28 GHz. The second frequency band may be a frequency band including a frequency of 39 GHz. For another example, the first frequency band may be a frequency band including a frequency of 39 GHz; the second frequency band may be a frequency band including a frequency of 28 GHz.

According to an embodiment, the communication circuit 630 may be electromagnetically coupled to the first antenna array 640 and the second antenna array 645 through a feeding line in the PCB 650. For example, the communication circuit 630 may be directly/indirectly connected to the first antenna array 640 and the second antenna array 645 through a feeding line in the PCB 650. According to an embodiment, the communication circuit 630 may be electromagnetically coupled to the first antenna array 640 through a feeding line in the PCB 650, and may be electromagnetically coupled to the second antenna array 645 through a separate cable (not illustrated). For example, the communication circuit 630 may be directly/indirectly connected to the second antenna array 645 through a feeding line in the PCB 650 and/or a cable (not illustrated). According to an embodiment, the communication circuit 630 may be mounted on the PCB 650 and may be electromagnetically connected to a communication module (e.g., the communication module 350 of FIG. 3) mounted on a separate PCB. The communication circuit 630 and the communication module 350 of FIG. 3 may be referred to as at least one wireless communication circuit.

According to an embodiment, the first antenna array 640 may include a plurality of first conductive plates (e.g., antenna elements). For example, the plurality of first conductive plates may be formed in the first portion 651 of the PCB 650 or on the first portion 651 of the PCB 650. The second antenna array 645 may include a plurality of second conductive plates (e.g., antenna elements). For example, the plurality of second conductive plates may be formed in the second portion 652 of the PCB 650 or on the second portion 652 of the PCB 650.

According to an embodiment, in the first operation, the communication circuit 650 may transmit and/or receive a first signal having a first frequency, using a plurality of first conductive plates (e.g., the antenna element of the first antenna array 640) and at least one, but not all, of second conductive plates (e.g., the antenna element of the second antenna array 645). In the second operation, the communication circuit 630 may transmit and/or receive a second signal having a second frequency different from the first frequency, using a plurality of second conductive plates and at least one, but not all, of first conductive plates.

According to various embodiments, the communication circuit 630 may transmit and/or receive a wireless signal, using the first antenna array 640 and/or the second antenna array 645.

According to an embodiment, the communication circuit 630 may be configured to transmit and receive a first wireless signal, using the first antenna array 640 and may be configured to transmit and receive a second wireless signal, using the second antenna array 645. According to an embodiment, the communication circuit 630 may be configured to transmit and receive a first wireless signal by additionally using at least one antenna element of the second antenna array 645. The communication circuit 630 may be configured to transmit and receive a second wireless signal, additionally using at least one antenna element of the first antenna array 640. For example, at least one antenna element of the first antenna array 640 and/or at least one antenna element of the second antenna array 645 may be configured to transmit and receive a first wireless signal and a second wireless signal. At least one antenna element of the first antenna array 640 and/or at least one antenna element of the second antenna array 645 may be an antenna element configured to transmit and receive a multi-band (e.g., dual band) wireless signal.

In the following description, unless described differently, the description given with reference to FIG. 6A with regard to the operation and configuration of the communication device 600 may be identically applied to the communication device 600 of FIGS. 6B to 6E. Thus, for convenience of description, additional description will be omitted to avoid redundancy.

Figure 6B:
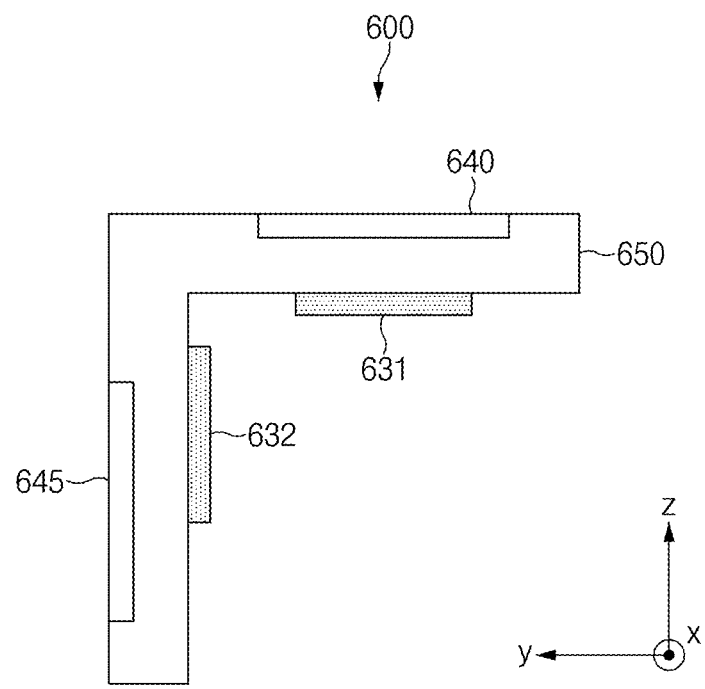
FIG. 6B illustrates another example of a communication device implemented as a single PCB according to various embodiments.

FIG. 6B illustrates another example of the communication device 600 implemented as a single PCB according to various embodiments.

Referring to FIG. 6B, according to various embodiments, the first communication circuit 631 may be configured to process, generate, and/or receive a first wireless signal having a center frequency in a first frequency band. The second communication circuit 632 may be configured to process, generate, and/or receive a second wireless signal having a center frequency in a second frequency band. For example, the first communication circuit 631 and the second communication circuit 632 may be referred to as the communication circuit 430 described above with respect to FIG. 4.

According to an embodiment, the first communication circuit 631 may be directly/indirectly connected to the first antenna array 640 through a feeding line in the PCB 650. For example, the first communication circuit 631 may be electromagnetically coupled to the first antenna array 640. The first communication circuit 631 may be electromagnetically coupled to at least one antenna element of the second antenna array 645 through a feeding line in the PCB 650 and/or a separate cable (not illustrated). According to an embodiment, the second communication circuit 632 may be directly/indirectly connected to the second antenna array 645 through a feeding line in the PCB 650. For example, the second communication circuit 632 may be electromagnetically coupled to the second antenna array 645. The second communication circuit 632 may be electromagnetically coupled to at least one antenna element of the first antenna array 640 through a feeding line in the PCB 650 and/or a separate cable (not illustrated).

According to an embodiment, the first communication circuit 631 may be configured to transmit and receive a first wireless signal, using the first antenna array 640; the second communication circuit 632 may be configured to transmit and receive a second wireless signal, using the second antenna array 645. According to an embodiment, the first communication circuit 631 may be configured to transmit and receive a first wireless signal by additionally using at least one antenna element of the second antenna array 645. The second communication circuit 632 may be configured to transmit and receive a second wireless signal, additionally using at least one antenna element of the first antenna array 640.

Figure 6C:
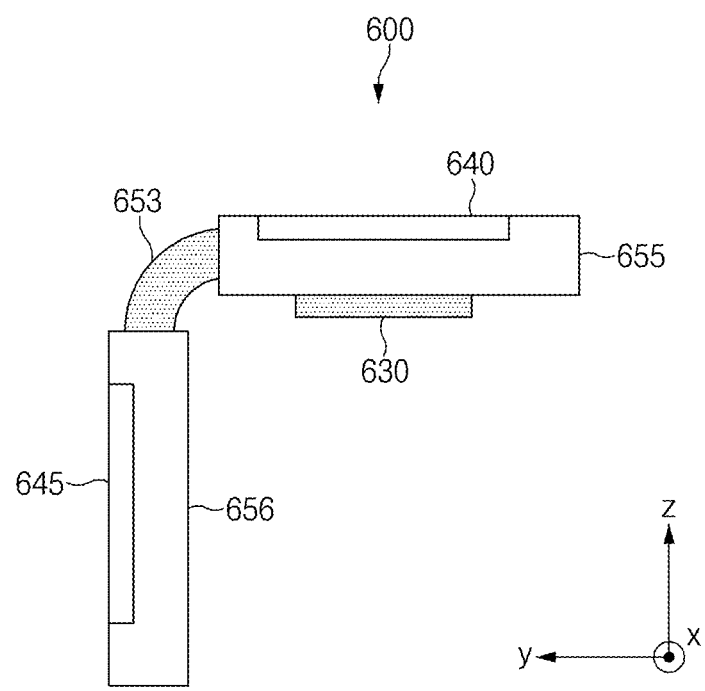
FIG. 6C illustrates an example of a communication device implemented with multiple PCBs according to various embodiments.

FIG. 6C illustrates an example of the communication device 600 implemented with multiple PCBs according to various embodiments.

Referring to FIG. 6C, according to various embodiments, the communication device 600 may be implemented using a first PCB 655, a second PCB 656, and the periphery part 653. For example, the first antenna array 640 may be disposed on the first side (e.g., a side parallel to X-Y plane and exposed to the outside in +Z axis direction) of the first PCB 655; the second antenna array 645 may be disposed on the second side (e.g., a surface parallel to X-Z plane and exposed to the outside in +Y axis direction) of the second PCB 656. The communication circuit 630 may be disposed on the opposing side (e.g., the plane in −Z axis direction) of the first side of the first PCB 655. For example, the first PCB 655 may correspond to the first portion 651 of FIG. 6A, and the second PCB 656 may correspond to the second portion 652.

According to an embodiment, the periphery part 653 may be formed of a flexible material. For example, the periphery part 653 may be a flexible PCB (FPCB) or cable (e.g., coaxial cable). The periphery part 653 may include at least a feeding line and/or at least one ground line.

According to various embodiments, the communication circuit 630 may be configured to process, generate, and/or receive a first wireless signal and a second wireless signal. According to an embodiment, the communication circuit 630 may be directly/indirectly connected to the first antenna array 640 through a feeding line in the first PCB 655. For example, the communication circuit 630 may be electromagnetically coupled to the first antenna array 640. The communication circuit 630 may be directly/indirectly connected to the first antenna array 640 through a feeding line in the first PCB 655, and may be directly/indirectly connected to the second antenna array 645 through the periphery part 653. For example, the communication circuit 630 may be electromagnetically coupled with the second antenna array 645 through the feeding line in the first PCB 655, the periphery part 653, and the feeding line of the second PCB 656. The description of the operations of the communication circuit 630 may be referenced by the description of the operation of the communication circuit 630 of FIG. 6A.

Figure 6D:
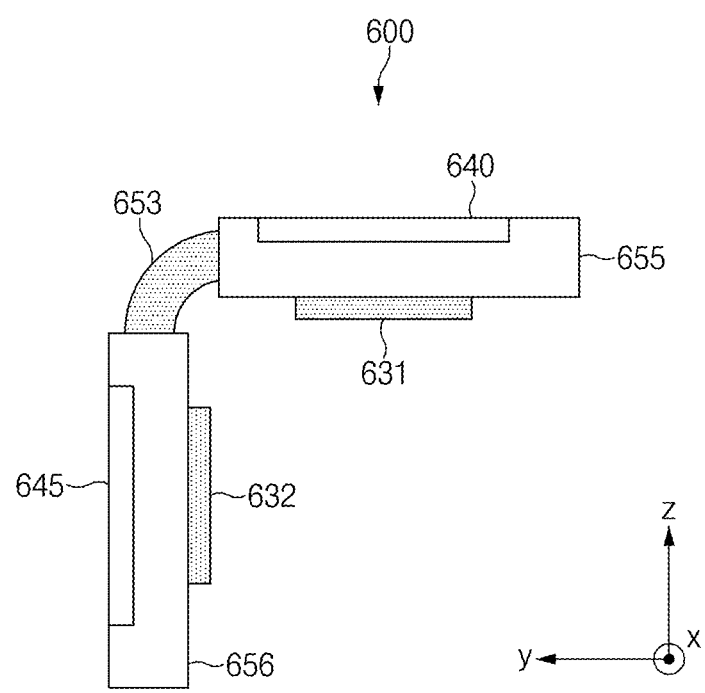
FIG. 6D illustrates another example of a communication device implemented with multiple PCBs according to various embodiments.

FIG. 6D illustrates another example of a communication device implemented with multiple PCBs according to various embodiments.

Referring to FIG. 6D, according to various embodiments, the communication device 600 may be implemented using the first PCB 655, the second PCB 656, and the periphery part 653. For example, the first antenna array 640 may be disposed on the first side (e.g., a side in +Z axis direction) of the first PCB 655; the second antenna array 645 may be disposed on the second side (e.g., a side in +Y-axis direction) of the second PCB 656. The first communication circuit 631 may be disposed or mounted on the opposing side (e.g., a side in −Z-axis direction) of the first side of the first PCB 655. The second communication circuit 632 may be disposed or mounted on an opposing side (e.g., a side in −Y axis direction) of the second side of the second PCB 656.

According to an embodiment, the first communication circuit 631 may be directly/indirectly connected to the first antenna array 640 through a feeding line in the first PCB 655. For example, the first communication circuit 631 may be electromagnetically coupled to the first antenna array 640. The first communication circuit 631 may be electromagnetically coupled to at least one antenna element of the second antenna array 645 through the periphery part 653. According to an embodiment, the second communication circuit 632 may be directly/indirectly connected to the second antenna array 645 through a feeding line in the second PCB 656. For example, the second communication circuit 632 may be electromagnetically coupled to the second antenna array 645. The second communication circuit 632 may be electromagnetically coupled to at least one antenna element of the first antenna array 640 through the periphery part 653.

According to an embodiment, the first communication circuit 631 may be mounted on the first PCB 655, and the second communication circuit 652 may be mounted on the second PCB 656. The first communication circuit 631 and the second communication circuit 652 may be electrically connected to a communication module (e.g., the communication module 350 of FIG. 3) mounted on a separate PCB (not illustrated). The first communication circuit 631, the second communication circuit 632, and the communication module 350 of FIG. 3 may be referred to as at least one wireless communication circuit.

Figure 6E:
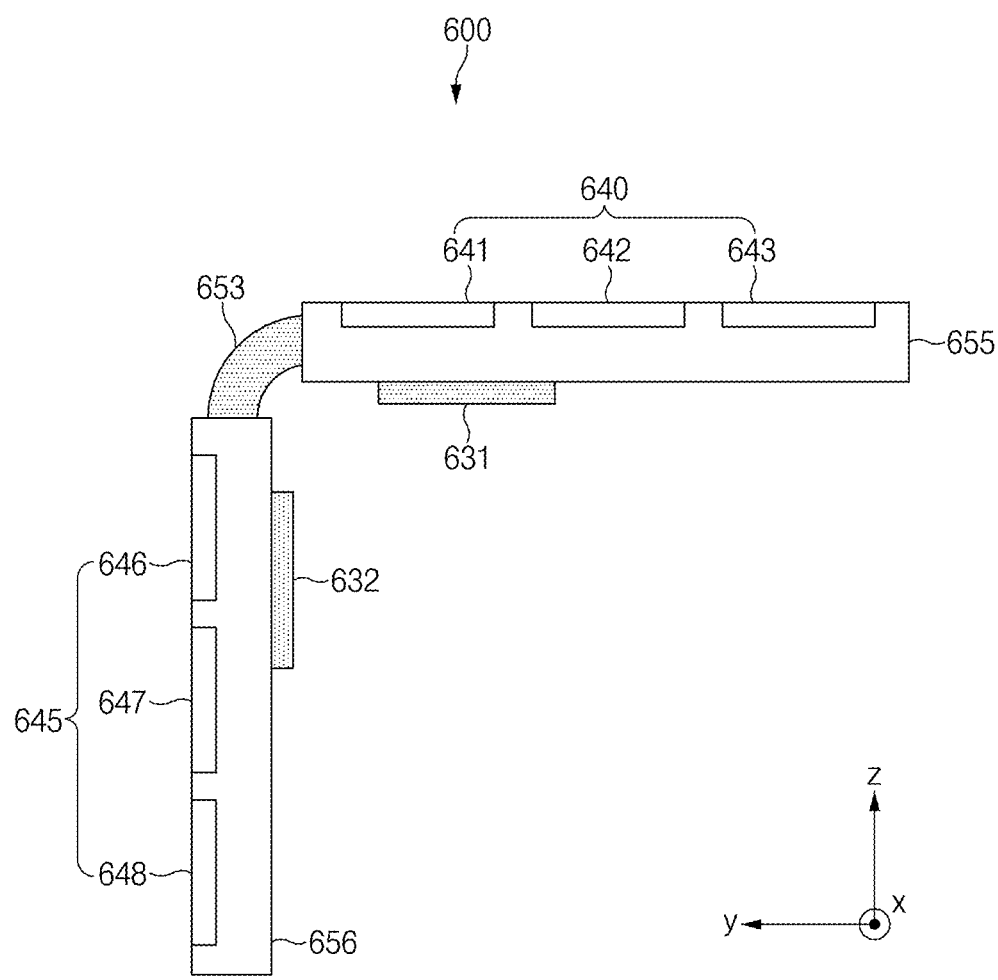
FIG. 6E illustrates still another example of a communication device implemented with multiple PCBs according to various embodiments.

FIG. 6E illustrates still another example of a communication device implemented with multiple PCBs according to various embodiments.

In FIG. 6E, the description of a configuration having the same reference numeral may be referenced by the description associated with FIG. 6D. For convenience of description, the redundant description will be omitted.

According to various embodiments, the first antenna array 640 and the second antenna array 645 may include a plurality of sub antenna arrays. According to an embodiment, the first antenna array 640 may include at least one of a first sub antenna array 641, a second sub antenna array 642, and a third sub antenna array 643. The second antenna array 645 may include at least one of a fourth sub antenna array 646, a fifth sub antenna array 647, and a sixth sub antenna array 648. For example, each of the first sub antenna array 641, the second sub antenna array 642, and the third sub antenna array 643 may include at least one antenna element. Each of the fourth sub antenna array 646, the fifth sub antenna array 647, and the sixth sub antenna array 648 may include at least one antenna element. At least part of the first sub antenna array 641, the second sub antenna array 642, the third sub antenna array 643, the fourth sub antenna array 646, the fifth sub antenna array 647, and/or the sixth sub antenna array 648 may include identical or different types of antenna elements (e.g., a patch antenna, a dipole antenna, and/or a shorted patch antenna).

According to various embodiments, the first communication circuit 631 may be configured to transmit and receive a first wireless signal, using the first antenna array 640; the second communication circuit 632 may be configured to transmit and receive a second wireless signal, using the second antenna array 645. According to an embodiment, the first communication circuit 631 may be configured to transmit and receive a first wireless signal, additionally using at least one antenna element or at least one sub antenna array of the second antenna array 645. For example, the first communication circuit 631 may be configured to transmit and receive a first wireless signal, using N antenna elements (N is a natural number) or M sub antenna arrays (M is a natural number) at a location (e.g., a location capable of being coupled or connected to the first communication circuit 631 through the shortest path) closest to the first communication circuit 631 or the periphery part 653 among the antenna elements of the second antenna array 645. The first communication circuit 631 may be configured to transmit and/or receive a first wireless signal, using at least one antenna element, but not all, of the antenna elements of the second antenna array 645 or using at least one sub antenna array, but not all, of the sub antenna arrays 646, 647, and 648 of the second antenna array 645. For example, the first communication circuit 631 may be configured to transmit and receive a first wireless signal, using at least one antenna element in the second sub antenna array 646 or at least one sub antenna array, which is closest to the periphery part 653 or the first communication circuit 631. According to an embodiment, the second communication circuit 632 may be configured to transmit and receive a second wireless signal, additionally using at least one antenna element or sub antenna array of the first antenna array 640. The second communication circuit 632 may be configured to transmit and/or receive a first wireless signal, using at least one antenna element, but not all, of the antenna elements of the first antenna array 640 or using at least one sub antenna array, but not all, of the sub antenna arrays 641, 642, and 643 of the first antenna array 640. For example, the second communication circuit 632 may be configured to transmit and receive a second wireless signal, using L antenna elements (L is a natural number) or K sub antenna arrays (K is a natural number) at a location (e.g., a location capable of being coupled or connected to the second communication circuit 632 through the shortest path) closest to the second communication circuit 632 or the connection part 653 among the antenna elements of the first antenna array 640. For example, the second communication circuit 632 may be configured to transmit and receive a second wireless signal, using at least one antenna element in the first sub antenna array 641 or a sub antenna array, which is closest to the periphery part 653 or the second communication circuit 632.

Figure 7:
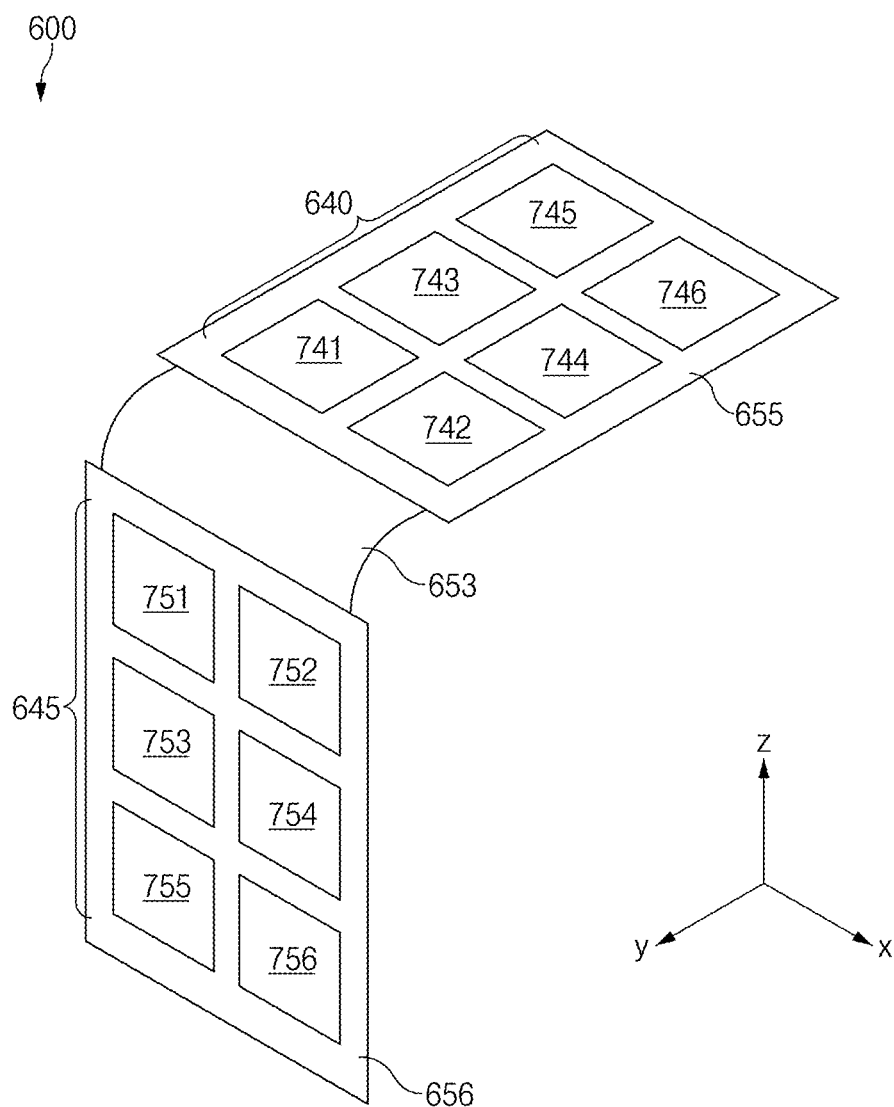
FIG. 7 illustrates a perspective view of a communication device according to various embodiments.

FIG. 7 illustrates a perspective view of the communication device 600 according to various embodiments.

Referring to FIG. 7, for example, the communication device 600 of FIG. 7 may correspond to the communication device 600 illustrated in FIG. 6E. According to an embodiment, the communication device 600 may include the first PCB 655, the second PCB 656, and the periphery part 653. The first antenna array 640 may be disposed on a first side (e.g., a side parallel to X-Y plane and exposed to the outside in +Z axis direction) of the first PCB 655; the first antenna array 640 may include at least one of a (1-1)-th antenna element 741, a (1-2)-th antenna element 742, a (1-3)-th antenna element 743, a (1-4)-th antenna element 744, a (1-5)-th antenna element 745, and/or a (1-6)-th antenna element 746. For example, the (1-1)-th antenna element 741 and the (1-2)-th antenna element 742 may be included in the first sub antenna array 641 of FIG. 6E. The (1-3)-th antenna element 743 and the (1-4)-th antenna element 744 may be included in the second sub antenna array 642. The (1-5)-th antenna element 745 and the (1-6)-th antenna element 746 may be included in the third sub antenna array 643. The second antenna array 645 may be disposed on a second side (e.g., a side parallel to X-Z plane and exposed to the outside in +Y axis direction) of the second PCB 656; the second antenna array 645 may include at least one of a (2-1)-th antenna element 751, a (2-2)-th antenna element 752, a (2-3)-th antenna element 753, a (2-4)-th antenna element 754, a (2-5)-th antenna element 755, and/or a (2-6)-th antenna element 756. For example, the (2-1)-th antenna element 751 and the (2-2)-th antenna element 752 may be included in the fourth sub antenna array 646 of FIG. 6E. The (2-3)-th antenna element 753 and the (2-4)-th antenna element 754 may be included in the fifth sub antenna array 647. The (2-5)-th antenna element 755 and the (2-6)-th antenna element 756 may be included in the sixth sub antenna array 648.

According to an embodiment, the first communication circuit (not illustrated) (e.g., the first communication circuit 631 in FIG. 6D) may be located on the rear side (e.g., a surface parallel to X-Y plane and exposed to the outside in −Z axis direction) of the first PCB 655. For example, the first communication circuit 631 may be configured to transmit and receive a first wireless signal, using the first antenna array 640. According to an embodiment, the first communication circuit 631 may be configured to transmit and receive a first wireless signal by additionally using at least one antenna element of the second antenna array 645. For example, the first communication circuit 631 may be configured to transmit and receive a first wireless signal, additionally using at least one antenna element (e.g., the (2-1)-th antenna element 751 and/or the (2-2)-th antenna element 752) located closest to the first communication circuit 631 or the periphery part 653 among the antenna elements of the second antenna array 645.

According to an embodiment, the second communication circuit (not illustrated) (e.g., the second communication circuit 632 in FIG. 6D) may be located on the rear side (e.g., a surface parallel to Y-Z plane and exposed to the outside in −X axis direction) of the second PCB 652. For example, the second communication circuit 632 may be configured to transmit and receive a second wireless signal, using the second antenna array 640. According to an embodiment, the second communication circuit 631 may be configured to transmit and receive a second wireless signal by additionally using at least one antenna element of the first antenna array 640. For example, the second communication circuit 632 may be configured to transmit and receive a second wireless signal, additionally using at least one antenna element (e.g., the (1-1)-th antenna element 741 and/or the (1-2)-th antenna element 742) located closest to the second communication circuit 632 or the periphery part 653 among the antenna elements of the first antenna array 640.

Figure 8A:
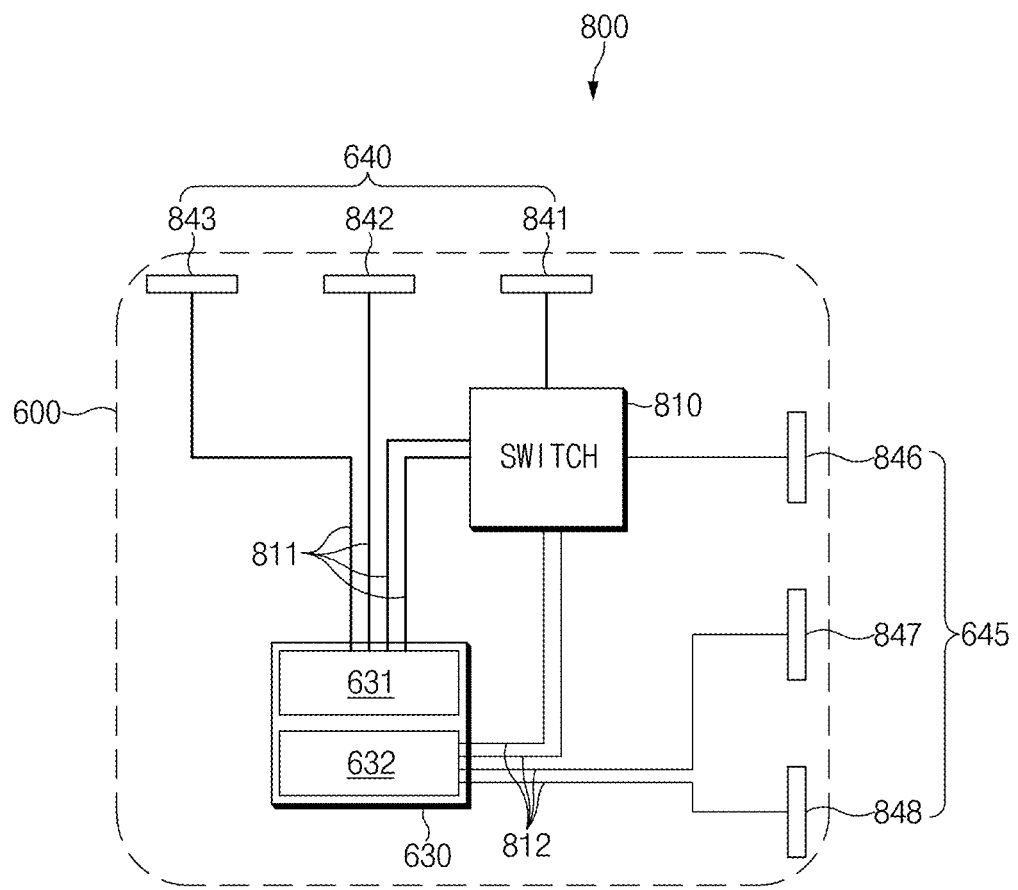
FIG. 8A illustrates a connection diagram of an example of a communication device according to various embodiments.

FIG. 8A illustrates a connection diagram 800 of an example of the communication device 600 according to various embodiments.

According to an embodiment, the first communication circuit 631 may transmit and receive a first wireless signal through first feeding lines 811. The second communication circuit 632 may transmit and receive a second wireless signal through second feeding lines 812. According to an embodiment, the first feeding lines 811 may electromagnetically couple the first antenna array 640 and at least part of the second antenna array 645 with the first communication circuit 631. For example, the first feeding lines 811 may electromagnetically couple or directly/indirectly connect a second antenna element 842 and a third antenna element 843 with the first communication circuit 631. The first feeding lines 811 may couple or connect the first communication circuit 631 to a first antenna element 841 and a fourth antenna element 846 through a switch 810. According to an embodiment, the second feeding lines 812 may electromagnetically couple the second antenna array 645 and at least part of the first antenna array 640 with the second communication circuit 631. For example, the second feeding line 812 may electromagnetically couple or directly/indirectly connect the second communication circuit 632 to a fifth antenna element 847 and a sixth antenna element 848. The second feeding lines 812 may couple or connect the second communication circuit 632 to the first antenna element 841 and the fourth antenna element 846 through the switch 810.

According to an embodiment, it may be assumed that the communication device 600 includes the first antenna element 841, the second antenna element 842, the fourth antenna element 846, and the fifth antenna element 847. For example, the first antenna array 640 may at least include the first antenna element 841 and the second antenna element 842, and may be referred to as a "first antenna set". The second antenna array 645 may at least include the fourth antenna element 846 and the fifth antenna element 847, and may be referred to as a "second antenna set". The fourth antenna element 846 may be positioned closer to the first antenna element 841 than the fifth antenna element 847. For example, in the first operation, the communication circuit 630 may transmit and/or receive a signal having a first frequency, using the first antenna element 841, the second antenna element 842, and the fourth antenna element 846, excluding the fifth antenna element 847. For example, in the second operation, the communication circuit 630 may transmit and/or receive a signal having a second frequency, using the first antenna element 841, the fourth antenna element 846, and the fifth antenna element 847, excluding the second antenna element 842.

According to an embodiment, the first antenna array 640 may include the first antenna element 841, the second antenna element 842, and the third antenna element 843, and may be referred to as a "first antenna set". The second antenna array 645 may include the fourth antenna element 846, the fifth antenna element 847, and the sixth antenna element 848, and may be referred to as a "second antenna set". The fourth antenna element 846 may be positioned closer to the first antenna element 841 than the fifth antenna element 847 and the sixth antenna element 848. For example, in the first operation, the communication circuit 630 may transmit and/or receive a signal having a first frequency, using the first antenna element 841, the second antenna element 842, the third antenna element 843, and the fourth antenna element 847, excluding the fifth antenna element 847 and the sixth antenna element 848. For example, in the second operation, the communication circuit 630 may transmit and/or receive a signal having a second frequency, using the first antenna element 841, the fourth antenna element 846, the fifth antenna element 847, and the sixth antenna element 848, excluding the second antenna element 842 and the third antenna element 843.

According to an embodiment, the switch 810 may directly/indirectly connect at least part of the first feeding lines 811 to the first antenna element 841 and the fourth antenna element 846, or may directly/indirectly connect at least part of the second feeding lines 812 to the first antenna element 841 and the fourth antenna element 846. For example, the switch 810 may connect at least part of the first feeding lines 811 or at least part of the second feeding lines 812 to the first antenna element 841 and the fourth antenna element 846, under the control of the communication device 630. According to an embodiment, in the first operation, the switch 810 may electrically connect the first antenna element 841, the second antenna element 842, the third antenna element 843, and the fourth antenna element 846. In the second operation, the switch 810 may electrically connect the first antenna element 841 to the fourth antenna element 846, the fifth antenna element 847, and the sixth antenna element 848, and may electrically disconnect the first antenna element 841 from the second antenna element 842 and the third antenna element 843.

According to an embodiment, the switch 810 may be implemented with a hardware configuration. For example, the switch 810 may be implemented with the PCB 650 (e.g., the first PCB 655 and/or the second PCB 656) and/or the periphery part 653 of the communication device 600. For example, the switch 810 may be controlled by the communication circuit 630.

Figure 8B:
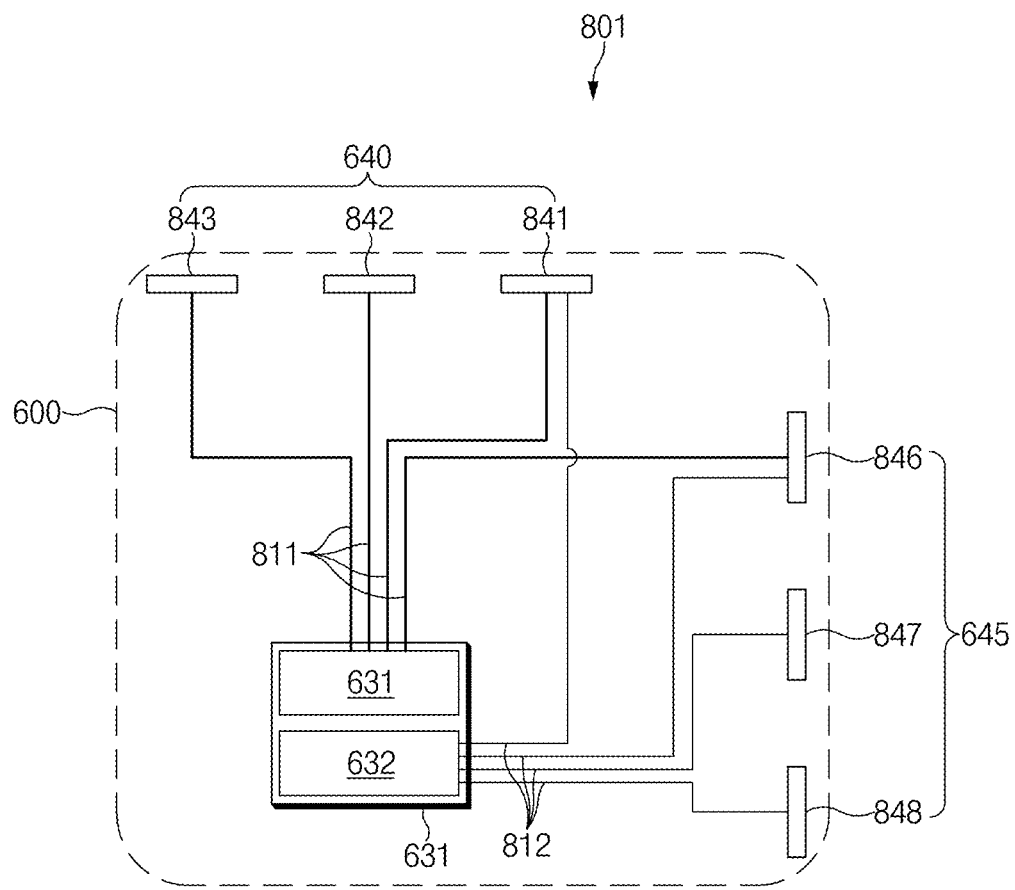
FIG. 8B illustrates a connection diagram of another example of a communication device according to various embodiments.

FIG. 8B illustrates a connection diagram 801 of another example of the communication device 600 according to various embodiments.

Referring to FIG. 8B, according to an embodiment, the first feeding lines 811 may electromagnetically couple or directly/indirectly connect the first communication circuit 631 to the first antenna element 841, the second antenna element 842, the third antenna element 843, and the fourth antenna element 846. The second feeding lines 812 may electromagnetically couple or directly/indirectly connect the second communication circuit 632 to the first antenna element 841, the fourth antenna element 846, the fifth antenna element 847, and the sixth antenna element 848.

Figure 9:
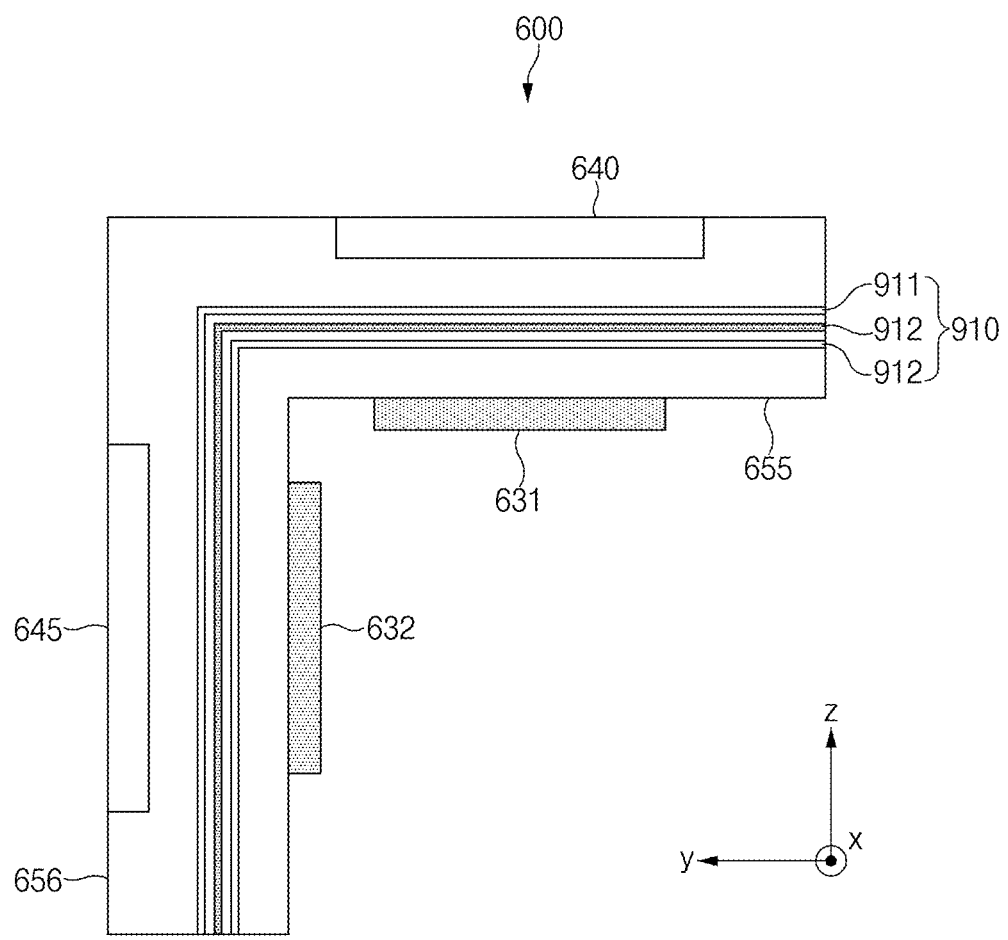
FIG. 9 illustrates a layer structure of a communication device according to various embodiments.

FIG. 9 illustrates a layer structure of a communication device according to various embodiments.

For example, the communication device 600 of FIG. 9 may correspond to the communication device 600 described above with reference to FIG. 6B. According to various embodiments, the PCB 650 may include at least one layer. For example, the PCB 650 may include a single layer. For another example, as illustrated in FIG. 9, the PCB 650 may include a plurality of layers (e.g., 4 to 12 layers). The plurality of layers may include at least one conductive layer and at least one insulating layer. When the PCB 650 includes a plurality of layers, at least part of the first feeding lines 811 and the second feeding lines 812 described above with reference to FIGS. 8A and 8B may be formed on at least one conductive layer among a plurality of layers. At least part of the first feeding lines 811 and the second feeding lines 812 may pass through the plurality of layers. For example, at least part of the first feeding lines 811 and the second feeding lines 812 may pass through the plurality of layers through a via or hole formed between the plurality of layers.

According to an embodiment, the PCB 650 may include a layer group 910. For example, the layer group 910 may include a first insulating layer 911, a conductive layer 912, and a second insulating layer 913. The conductive layer 912 may be used for ground (GND) or feeding. FIG. 9 is a diagram for describing a layer of the PCB 650, and the structure of the layer of the PCB 650 in the embodiments of the disclosure is not limited thereto. For example, the PCB 650 may be illustrated in a vertically curved shape in FIG. 9, but the PCB 650 may have a bent shape depending on at least one curvature. The layer (e.g., the layer group 910) in the PCB 650 may have a bent shape depending on the shape of the PCB 650. According to an embodiment, the layer in the PCB 650 may be generated in consideration of bending processing.

In FIG. 9, the structure of the PCB 650 has been described as focused on the communication device 600 of FIG. 6B, but the structure of the PCB 650 described with reference to FIG. 9 may be applied to the PCB 650 of FIG. 6A, and may be applied to the first PCB 651 and the second PCB 652 of FIGS. 6C, 6D, and 6E FIGS. 10A and 10B illustrate an example of a feeding line of the communication device 600 according to various embodiments.

Figure 10A:
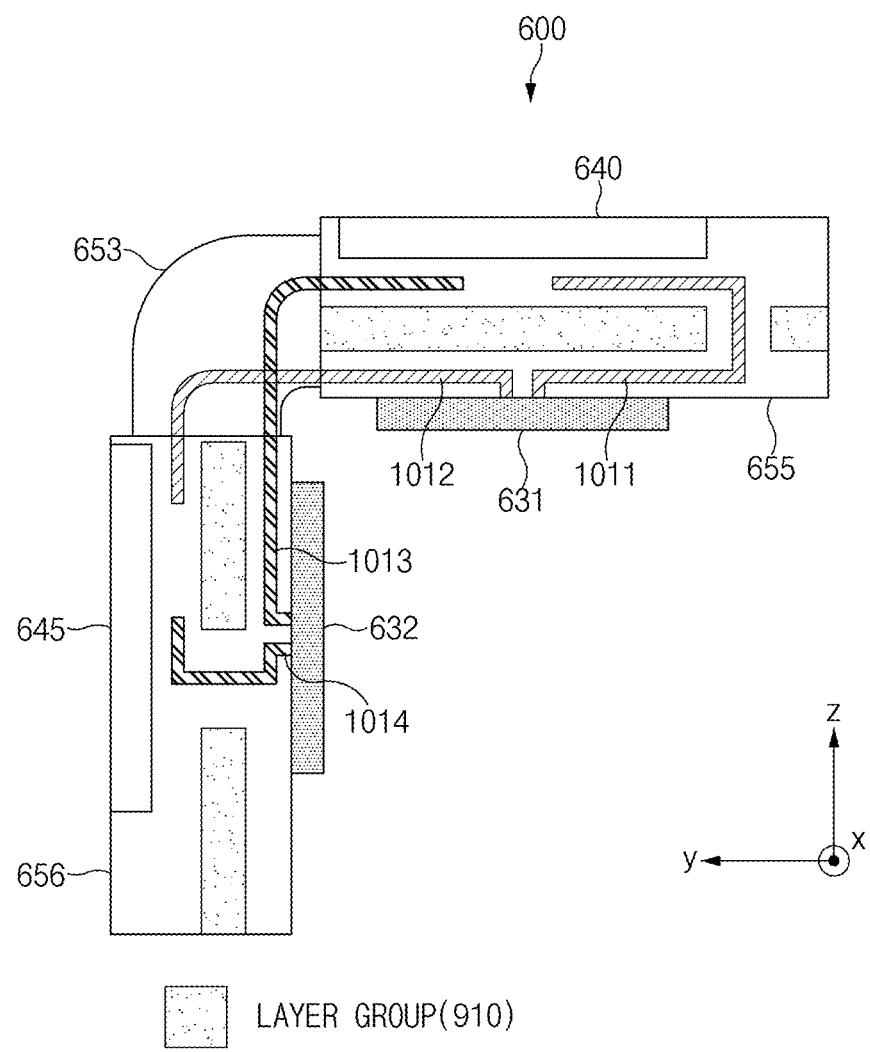
FIG. 10A illustrates an example of a feeding line of a communication device according to various embodiments.

Referring to FIG. 10A, according to various embodiments, the first communication circuit 631 may be coupled or connected to at least one antenna element of the first antenna array 640 through a first feeding line 1011. The first communication circuit 631 may be coupled or connected to at least one antenna element of the second antenna array 645 through a second feeding line 1012. The second communication circuit 632 may be coupled or connected to at least one antenna element of the first antenna array 640 through a third feeding line 1013. The second communication circuit 632 may be coupled or connected to at least one element of the second antenna array 645 through a fourth feeding line 1014.

According to various embodiments, at least part of the feeding lines 1011, 1012, 1013, and 1014 may be formed to penetrate at least part of the layer group 910 including a plurality of layers. For example, at least part of the feeding lines 1011, 1012, 1013, and 1014 may be formed through a via or a hole formed in the layer group 910.

According to an embodiment, the first communication circuit 631 may transmit and receive a signal having a first frequency (e.g., 28 GHz) using the first antenna array 640. The first communication circuit 631 may transmit/receive a signal having a first frequency, additionally using at least one antenna element of the second antenna array 645. For example, at least one antenna element of the second antenna array 645 may be an antenna element configured to transmit and receive a signal having the first frequency and the second frequency (e.g., 39 GHz). According to an embodiment, the second communication circuit 632 may transmit and receive a signal having the second frequency, using the second antenna array 645. The second communication circuit 632 may transmit and receive a signal having a second frequency, additionally using at least one antenna element of the first antenna array 640. For example, at least one antenna element of the first antenna array 640 may be an antenna element configured to transmit and receive a signal having the first frequency and the second frequency.

According to various embodiments, the communication device 600 may have a bent shape. Referring to FIG. 10A, according to an embodiment, the communication device 600 may include the first PCB 655, the second PCB 656, and the periphery part 653. For example, the periphery part 653 may provide the first PCB 655 and the second PCB 656 with physical, electrical, and/or magnetic connections. The periphery part 653 may include a flexible material. According to an embodiment, the periphery part 653 may include at least one layer, and may include layers of which the number is not greater than the number of layers of the first PCB 655 and the second PCB 656. For example, the periphery part 653 may have a thickness thinner than the thickness of the first PCB 655 and the second PCB 656.

Figure 10B:
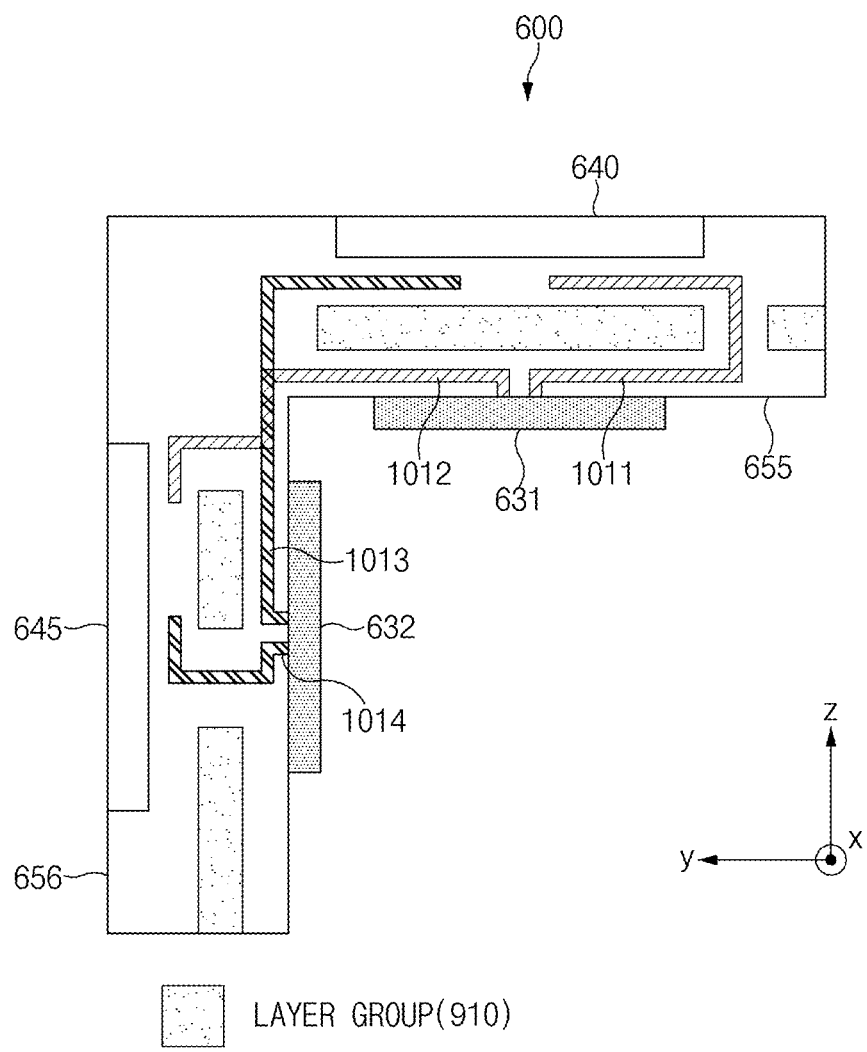
FIG. 10B illustrates an example of a feeding line of a communication device according to various embodiments.

Unless otherwise described, the description of the communication device 600 of FIG. 10B may be referenced by the description of the communication device 600 of FIG. 10A with reference to FIG. 10B. According to an embodiment, the communication device 600 may include the PCB 650 having a bent shape. In FIG. 10B, the PCB 650 may be illustrated in a vertically bent shape, but the PCB 650 may have a bent shape depending on a curve having at least one curvature. The layer in the PCB 650 may have a bent shape depending on the shape of the PCB 650. According to an embodiment, the layer in the PCB 650 may be generated in consideration of bending processing. For example, the bent portion of the PCB 650 may be referred to as a "periphery part".

The location of the layer group 910 illustrated in FIGS. 10A and 10B is exemplary, and the shape of the layer group 910 is not limited thereto. For example, the layer group 910 may be also present in an area not illustrated in FIGS. 10A and 10B.

Figure 11A:
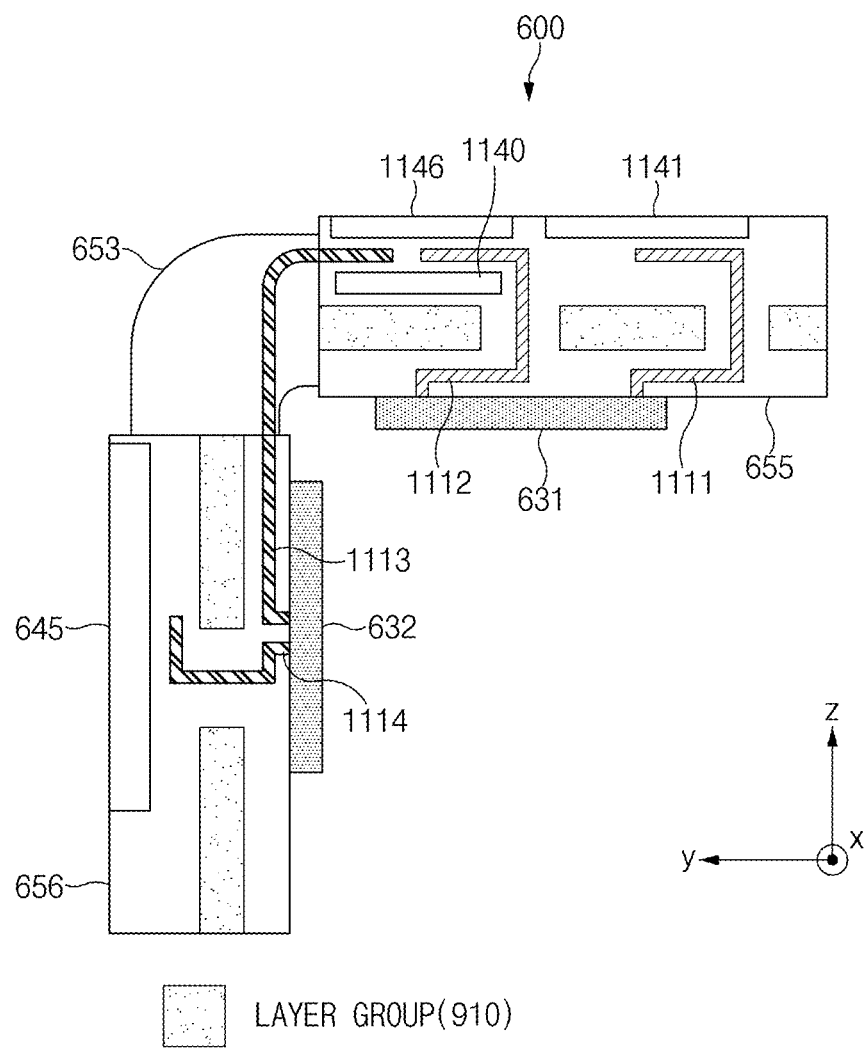
FIG. 11A illustrates a first example of a feeding line of a communication device including a dual feeding antenna element according to various embodiments.

FIG. 11A illustrates a first example of a feeding line of a communication device including a dual feeding antenna element according to various embodiments.

Referring to FIG. 11A, according to various embodiments, the communication device 600 may include a first sub antenna array 1141 and/or a second sub antenna array 1146, which is disposed on a first side (a side facing +Z direction) of the first PCB 655. For example, the first sub antenna array 1141 and the second sub antenna array 1146 may include at least one antenna element configured to transmit and receive a first wireless signal. According to an embodiment, the communication device 600 may include a third sub antenna array 1140 disposed in parallel with the second sub antenna array 1146. For example, the third sub antenna array 1140 may be disposed inside the first PCB 655 (e.g., at least one layer inside the first PCB 655), and may be aligned with the second sub antenna array 1146. The third sub antenna array 1140 may include at least one antenna element configured to transmit and receive a second wireless signal. For example, the first sub antenna array 1141, the second sub antenna array 1146, and the third sub antenna array 1140 may include a plurality of antenna elements configured to radiate a signal in a direction (e.g., +Z axis).

According to various embodiments, the first communication circuit 631 may be coupled or connected to at least one antenna element of the first sub antenna array 1141 disposed on the first side of the first PCB 655 through a first feeding line 1111. The first communication circuit 631 may be coupled or connected to at least one antenna element of the second sub antenna array 1146 disposed on the first side of the first PCB 655 through a second feeding line 1112. According to an embodiment, the first communication circuit 631 may be coupled or connected to the second antenna array 1146 and the third sub antenna array 1140 through the second feeding line 1112.

According to an embodiment, the second communication circuit 632 may be coupled or connected to the second sub antenna array 1146 and the third sub antenna array 1140 through a third feeding line 1113. For example, the second communication circuit 632 may supply a second wireless signal to the third sub antenna array 1140 and/or the second sub antenna array 1146 through the third feeding line 1113. According to an embodiment, the second communication circuit 632 may be coupled or connected to the second antenna array 645 through a fourth feeding line 1114. For example, the second communication circuit 632 may be configured to transmit and receive a second wireless signal through the second antenna array 645.

According to an embodiment, the first communication circuit 631 may transmit and receive a signal having the first frequency (e.g., 28 GHz), using the first sub antenna array 1141 and the second sub antenna array 1146. According to an embodiment, the second communication circuit 632 may transmit and receive a signal having the second frequency, using the second antenna array 645. The second communication circuit 632 may transmit and receive a signal having a second frequency, additionally using the third sub antenna array 1140.

In FIG. 11A, the communication device 600 is illustrated as being implemented using a plurality of PCBs, but as illustrated in FIG. 10B, the communication device 600 may be implemented using one PCB.

Figure 11B:
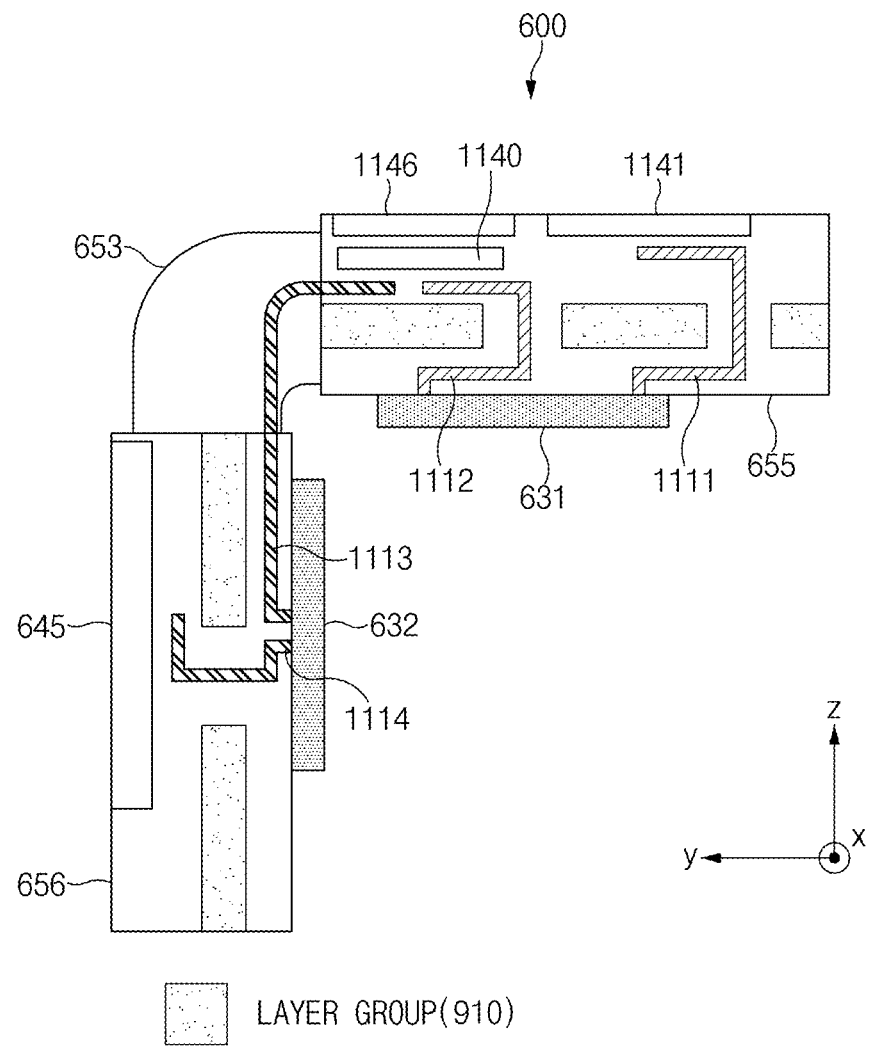
FIG. 11B illustrates a second example of a feeding line of a communication device including a dual feeding antenna element according to various embodiments.

FIG. 11B illustrates a second example of a feeding line of the communication device 600 including a dual feeding antenna element according to various embodiments.

Unless otherwise described, the description of the communication device 600 of FIG. 11B may be referenced by the description associated with FIG. 11A with reference to FIG. 11B.

In the communication device 600 of FIG. 11B, the first communication circuit 631 and the second communication circuit 632 may be connected or coupled to the second sub antenna array 1146 and/or the third sub antenna array 1140. According to an embodiment, at least part of the second feeding line 1112 of the communication device 600 may be formed between the second sub antenna array 1146 and the second side of the first PCB 655 on which the first communication circuit 631 is disposed. At least part of the third feeding line 1113 of the communication device 600 may be formed between the third sub antenna array 1140 and the second side of the first PCB 655 on which the first communication circuit 631 is disposed.

Figure 11C:
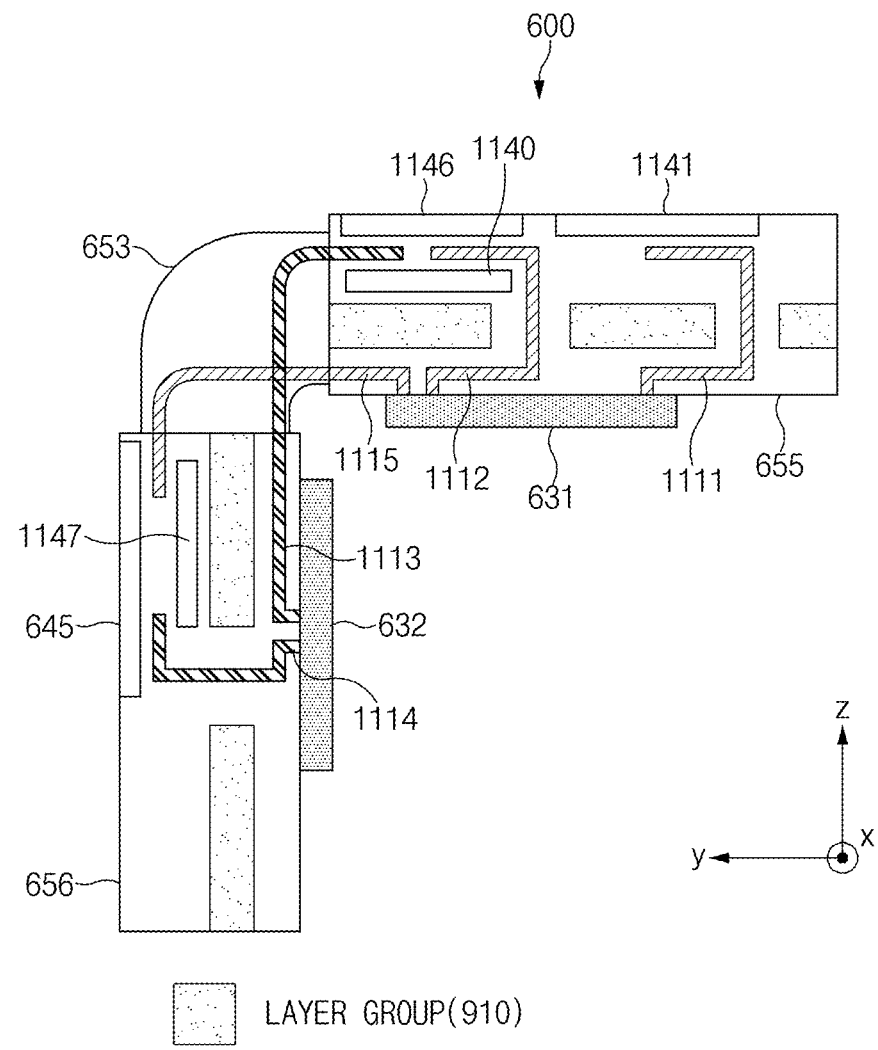
FIG. 11C illustrates a third example of a feeding line of a communication device including a dual feeding antenna element according to various embodiments.

FIG. 11C illustrates a third example of a feeding line of a communication device including a dual feeding antenna element according to various embodiments. Unless otherwise described, the description of the communication device 600 of FIG. 11C may be referenced by the description associated with FIG. 11A with reference to FIG. 11C.

In FIGS. 11A and 11B, it is illustrated that an antenna array having a dual feeding structure is positioned on only the first PCB 655. FIGS. 11A and 11B are exemplary, and the communication device 600 may include an antenna array having a dual feeding structure mounted on the second PCB 656.

According to an embodiment, the communication device 600 may include the second antenna array 645 and a fourth sub antenna array 1147, which are disposed on the third side (a side parallel to X-Z plane and exposed to the outside in +Y axis direction) of the second PCB 656. For example, the second antenna array 645 may include at least one antenna element configured to transmit and receive a second wireless signal. The fourth sub antenna array 1147 may include at least one antenna element configured to transmit and receive a first wireless signal.

According to an embodiment, the fourth sub antenna array 1147 may be arranged in parallel with the second antenna array 645, and may be aligned with the second antenna array 645. For example, the fourth sub antenna array 1147 may be disposed inside the second PCB 656 (e.g., at least one layer inside the second PCB 656), and may be aligned with the second antenna array 645.

According to various embodiments, the first communication circuit 631 may be coupled or connected to the fourth sub antenna array 1147 disposed on the second PCB 655 through a fifth feeding line 1115.

According to an embodiment, the first communication circuit 631 may transmit and receive a signal having the first frequency (e.g., 28 GHz), using the first sub antenna array 1141 and the second sub antenna array 1146. The first communication circuit 631 may transmit and receive a signal having a first frequency, additionally using the fourth sub antenna array 1147.

The communication device 600 implemented using a plurality of PCBs is described with reference to FIGS. 11A, 11B, and 11C described above. The shape of the communication device 600 of FIGS. 11A, 11B, and 11C is exemplary, and as illustrated in FIG. 10B, the communication device 600 may be implemented using a single PCB. Besides, the communication device 600 illustrated in FIGS. 11A, 11B, and 11C includes only one antenna array on the second PCB 656, but one or more antenna arrays (or sub antenna arrays) may be mounted on the second PCB 656. For another example, one or more antenna arrays (or sub antenna arrays) may be mounted on the first PCB 655.

Figure 12:
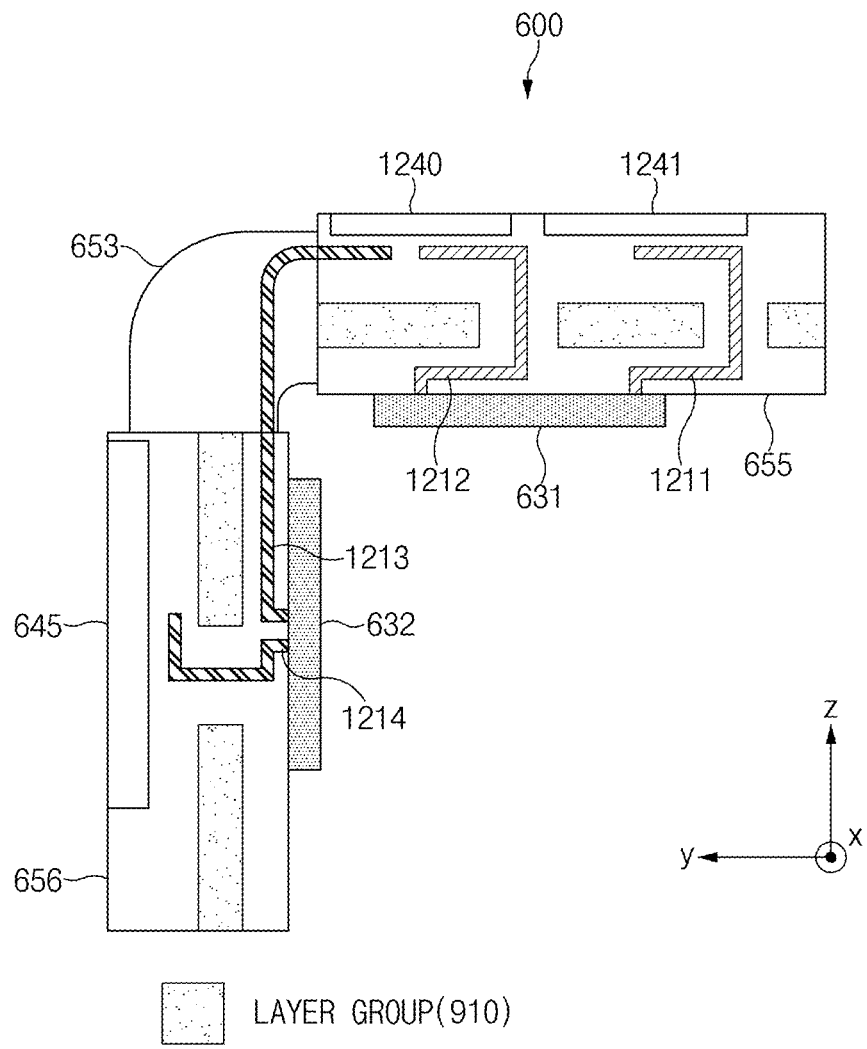
FIG. 12 illustrates another example of a communication device including a dual feeding antenna element according to various embodiments.

FIG. 12 illustrates another example of the communication device 600 including a dual feeding antenna element according to various embodiments.

Referring to FIG. 12, according to various embodiments, the communication device 600 may include a first sub antenna array 1240 and/or second sub antenna array 1241 disposed on the first side (a side parallel to X-Y plane and exposed to the outside in +Z direction) of the first PCB 655. For example, the second sub antenna array 1241 may include at least one antenna element configured to transmit and receive a first wireless signal. For example, the first sub antenna array 1240 may include at least one antenna element configured to transmit and receive a first wireless signal and/or a second wireless signal. The first sub antenna array 1240 may include an antenna element supporting dual bands.

According to various embodiments, the first communication circuit 631 may be coupled or connected to at least one antenna element of the second sub antenna array 1241 through a first feeding line 1211. The first communication circuit 631 may be coupled or connected to at least one antenna element of the first sub antenna array 1240 through a second feeding line 1212.

According to an embodiment, the second communication circuit 632 may be coupled or connected to the first sub antenna array 1240 through a third feeding line 1213. For example, the second communication circuit 632 may supply a second wireless signal to the first sub antenna array 1240 through the third feeding line 1213. According to an embodiment, the second communication circuit 632 may be coupled or connected to the second antenna array 645 through a fourth feeding line 1214. For example, the second communication circuit 632 may be configured to transmit and receive a second wireless signal through the second antenna array 645.

According to an embodiment, the first communication circuit 631 may transmit and receive a signal having the first frequency (e.g., 28 GHz), using the first sub antenna array 1240 and the second sub antenna array 1241. According to an embodiment, the second communication circuit 632 may transmit and receive a signal having the second frequency, using the second antenna array 645. The second communication circuit 632 may transmit and receive a signal having a second frequency, additionally using the first sub antenna array 1240.

The shape of the communication device 600 of FIG. 12 is exemplary, and as illustrated in FIG. 10B, the communication device 600 may be implemented using a single PCB. As described above with respect to FIG. 11C, the communication device 600 may include an antenna element or antenna array for supporting a dual band mounted on the second PCB 656.

According to various embodiments, referring to FIG. 2, the electronic device 101 may include the housing 210 including a first plate (e.g., the cover glass 211 of FIG. 2), a second plate (e.g., the back cover 212 of FIG. 2) facing away from the first plate, and a side member (e.g., the first side surfaces 210a, 210b, 210c, and 210d and the second side surface 214) surrounding a space between the first plate and the second plate. The electronic device 101 may include a display 220 viewable through a part of the first plate and positioned in the housing 210. The electronic device 101 may include an antenna structure positioned in the housing 210. For example, the antenna structure may be referred to as a communication device (e.g., the communication device 600 of FIG. 6E), antenna module, or RFA module.

Referring to FIG. 6E, according to an embodiment, an antenna structure may include a first planar structure (e.g., the first PCB 655 and the periphery part 653), a second planar structure (e.g., the second PCB 656), and at least one wireless communication circuit (e.g., the first communication circuit 631 and/or the second communication circuit 632). The first planar structure may include a periphery 653 facing a first direction (e.g., +Z direction) toward the second plate and extending along a first portion of the side member when viewed from above the second plate, and may include a plurality of first conductive plates (e.g., the first antenna array 640) formed in the first planar structure or on the first planar structure. The second planar structure may include a plurality of second conductive plates (e.g., the second antenna array 645) facing a second direction (e.g., +Y direction) toward the first portion of the side member, and formed in or on the second planar structure.

According to an embodiment, at least one wireless communication circuit (e.g., the first communication circuit 631) may be electrically connected to the plurality of first conductive plates and the plurality of second conductive plates and may be configured to transmit and/or receive a signal having a frequency between 3 GHz and 100 GHz. According to an embodiment, in a first operation, the at least one wireless communication circuit may transmit and/or receive a first signal having a first frequency, using the plurality of first conductive plates (e.g., the first antenna array 640) and at least one (e.g., the fourth sub antenna array 646), but not all, of the plurality of second conductive plates (e.g., the second antenna array 645).

According to an embodiment, in a second operation, the at least one wireless communication circuit (e.g., the second communication circuit 632) may transmit and/or receive a second signal having a second frequency different from the first frequency, using the plurality of second conductive plates (e.g., the second antenna array 645) and at least one (e.g., the first sub antenna array 641), but not all, of the plurality of first conductive plates (e.g., the first antenna array 640).

According to an embodiment, the first planar structure (e.g., the first PCB 655 and the periphery part 653) may be connected to the second planar structure (e.g., the second PCB 656) through the periphery (e.g., the periphery part 653). According to an embodiment, the first planar structure may be curved from the second planar structure. According to an embodiment, the first planar structure is connected to the second planar structure through a flexible layer (e.g., the periphery part 653). For example, the flexible layer may include a flexible printed circuit board (PCB).

According to an embodiment, the plurality of first conductive plates (e.g., the first antenna array 640) may include a first conductive plate (e.g., the first sub antenna array 641) closest to the periphery (e.g., the periphery part 653) among the plurality of first conductive plates, and the at least one, but not all, of the plurality of first conductive plates may include the first conductive plate. The plurality of second conductive plates (e.g., the second antenna array 645) may include a second conductive plate closest to the periphery among the plurality of second conductive plates (e.g., the fourth sub antenna array 646), and the at least one, but not all, of the plurality of second conductive plates may include the second conductive plate.

According to an embodiment, the first planar structure may include a first PCB 655, and the second planar structure may include a second PCB 656. The electronic device 101 may further include a third PCB (e.g., the PCB 310 of FIG. 3) in parallel with the first planar structure between the display 220 and the second plate 212.

According to an embodiment, a first portion (e.g., the first communication circuit 631) of the at least one wireless communication circuit may be mounted on the first PCB 655. A second portion (e.g., the second communication circuit 632) of the at least one wireless communication circuit may be mounted on the second PCB. A third portion (e.g., the communication module 350 of FIG. 3) of the at least one wireless communication circuit may be mounted on the third PCB while being electrically connected to the first portion (e.g., the first PCB 655) and the second portion (e.g., the second PCB 656).

According to an embodiment, the first planar structure (e.g., the first PCB 655) may be substantially perpendicular to the second structure (e.g., the second PCB 656).

According to an embodiment, the electronic device 101 may include housing 210, a display 220 viewable from the front surface (e.g., the cover glass 211) of the electronic device 101 and at least partially accommodated inside the housing 210, a first antenna set (e.g., the first antenna array 640) including a first antenna (e.g., the second sub antenna array 642) and a second antenna (e.g., the first sub antenna array 641), facing a first side surface (e.g., +Z axis direction) of the electronic device 101, and at least partially accommodated inside the housing 210, a second antenna set (e.g., the second antenna array 645) including a fourth antenna (e.g., the fifth sub antenna array 647) and a third antenna (e.g., the fourth sub antenna array 646) positioned closer to the second antenna than the fourth antenna, facing a second side surface (e.g., +Y axis direction) of the electronic device substantially perpendicular to the first side surface, and at least partially accommodated inside the housing 210, and at least one wireless communication circuit (e.g., the first communication circuit 631 and/or the second communication circuit 632) electrically connected to the first antenna set and the second antenna set.

According to an embodiment, in a first operation, at least one wireless communication circuit (e.g., the first communication circuit 631) may transmit and/or receive a first signal having a first frequency, using the first antenna, the second antenna, and the third antenna, excluding the fourth antenna. According to an embodiment, in a second operation, at least one wireless communication circuit (e.g., the second communication circuit 632) may transmit and/or receive a second signal having a second frequency different from the first frequency, using the second antenna, the third antenna, and the fourth antenna excluding the first antenna.

According to an embodiment, the electronic device 101 may further include a switch (e.g., the switch 810 of FIG. 8) electrically connected to the second antenna and the third antenna. For example, in the first operation, the switch 810 may electrically connect the third antenna with the first antenna and the second antenna and may electrically disconnect the fourth antenna from the third antenna. For example, in the second operation, the switch 810 may electrically connect the second antenna with the third antenna and the fourth antenna and may electrically disconnect the first antenna from the second antenna. According to an embodiment, the at least one wireless communication circuit may be configured to control the connection and/or disconnection.

According to an embodiment, an electronic device 101 may include a housing 210 forming an exterior of the electronic device 101, and including a front surface, a back surface facing away from the front surface, and a side surface at least partially surrounding a space between the front surface and the back surface, and a communication device 600 including a first antenna array 640 configured to radiate a signal toward the back surface inside the housing 210, and a second antenna array 645 configured to radiate a signal toward the side surface. The first antenna array 640 may include a plurality of first antenna elements (e.g., the sub antenna arrays 641, 642, and 643). The second antenna array 645 may include a plurality of second antenna elements (e.g., the sub antenna arrays 646, 647, and 648). The communication device 600 may be configured to radiate a signal in a first frequency band, using the plurality of first antenna elements (e.g., the first antenna array 640) and at least one second antenna element of the plurality of second antenna elements (e.g., the fourth sub antenna array 646), and to radiate a signal in a second frequency band, using the plurality of second antenna elements (e.g., the second antenna array 645) and at least one first antenna element of the plurality of first antenna elements (e.g., the first sub antenna array 641).

According to an embodiment, the communication device 600 may include a printed circuit board (PCB) (e.g., the PCB 650 of FIG. 6A), and the PCB 650 may be a rigid bended PCB.

According to an embodiment, the communication device 600 may include a first PCB 655 and a second PCB 656. The first antenna 640 array may be disposed on a first side of the first PCB 655. The second antenna 645 array may be disposed on a second side of the second PCB 656. The first PCB 655 and the second PCB 656 may be connected through a coaxial cable or a flexible printed circuit board (FPCB) (e.g., the periphery part 653).

According to an embodiment, the communication device 600 may further include a first communication circuit 631 disposed on an opposing side of the first side and configured to transmit and receive a signal in a first frequency band, and a second communication circuit 656 disposed on an opposing side of the second side and configured to transmit and receive a signal in a second frequency band. The first communication circuit 631 may be further configured to transmit a signal in the first frequency band, using a second antenna element (e.g., the fourth sub antenna array 646), which is located in the shortest path with the first communication circuit, from among the plurality of second antenna elements. The second circuit 632 may be further configured to transmit a signal in the second frequency band, using a first antenna element (e.g., the first sub antenna array 641), which is located in the shortest path with the second communication circuit 632, from among the plurality of first antenna elements.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. A portable communication device comprising:
   a housing;
   a first printed circuit board (PCB) disposed in the housing;
   a second PCB disposed in the housing and spaced apart from the first PCB;
   a radio frequency integrated circuit (RFIC) disposed in the housing;
   a first antenna array disposed at the first PCB and electrically connected with the RFIC, the first antenna array configured to radiate a first beam using a first signal provided by the RFIC and corresponding to a first frequency band;
   a second antenna array disposed at the first PCB and electrically connected with the RFIC, the second antenna array configured to radiate a second beam using a second signal provided by the RFIC and corresponding to a second frequency band substantially different from the first frequency band;
   a third antenna array disposed at a first layer of the second PCB and electrically connected with the RFIC, the third antenna array configured to radiate a third beam using a third signal provided by the RFIC and corresponding to the first frequency band;
   a fourth antenna array disposed at a second layer, different with the first layer, of the second PCB and electrically connected with the RFIC, the fourth antenna array configured to radiate a fourth beam using a fourth signal provided by the RFIC and corresponding to the second frequency band; and
   a flexible PCB (FPCB) electrically connecting the first PCB with the second PCB such that the third and fourth antenna arrays are electrically connected with the RFIC via the flexible PCB,
   wherein the third antenna array is disposed in parallel with the fourth antenna array and aligned with the fourth antenna array.

2. The portable communication device of claim 1, wherein the first antenna array faces a rear surface of the housing.

3. The portable communication device of claim 2, wherein the first antenna array and the second antenna array are configured to radiate beams toward the rear surface.

4. The portable communication device of claim 1,
   wherein the third antenna array is configured to transmit or receive a signal of 39 GHz, and
   wherein the fourth antenna array is configured transmit or receive a signal of 28 GHz.

5. The portable communication device of claim 1,
   wherein the first antenna array comprises a plurality of patch antenna elements, and
   wherein the third antenna array comprises a plurality of patch antenna elements.

6. The portable communication device of claim 1,
   wherein, when viewed from above the first antenna array, the second antenna array is located below the third antenna array.

7. The portable communication device of claim 1, wherein the RFIC is configured to:
   responsive to being set in a first operation using the first frequency band, transmit the first signal to the first antenna array, and transmit the third signal to the third antenna array; and responsive to being set in a second operation using the second frequency band, transmit the second signal to the second antenna array, and transmit the fourth signal to the fourth antenna array.

8. The portable communication device of claim 1, wherein the RFIC is disposed at the first PCB.

9. The portable communication device of claim 1, wherein the FPCB is connected between the first PCB and the second PCB.

10. The portable communication device of claim 9, wherein the first PCB is a main PCB where a baseband processor is located.

11. A portable communication device comprising:
a housing comprising a first exterior side and a second exterior side;
a first printed circuit board (PCB) disposed in the housing;
a second PCB disposed in the housing and spaced apart from the first PCB;
a radio frequency integrated circuit (RFIC) disposed in the housing;
a first antenna array disposed at a first layer of the first PCB and electrically connected with the RFIC;
a second antenna array disposed at a second layer the first PCB and electrically connected with the RFIC;
a third antenna array disposed at the second PCB and electrically connected with the RFIC; and
a fourth antenna array disposed at the second PCB and electrically connected with the RFIC,
wherein the third antenna array is disposed in parallel with the fourth antenna array and aligned with the fourth antenna array.

12. The portable communication device of claim 11, wherein a flexible PCB electrically connecting the first PCB with the second PCB such that the third and fourth antenna arrays are electrically connected with the RFIC via the flexible PCB.

13. The portable communication device of claim 11, wherein the RFIC is configured to:
radiate a first beam through the first antenna array using a first signal corresponding to a first frequency band,
radiate a second beam through the second antenna array using a second signal corresponding to a second frequency band different from the first frequency band,
radiate a third beam through the third antenna array using a third signal corresponding to the first frequency band, and
radiate a fourth beam through the fourth antenna array using a fourth signal corresponding to the second frequency band.

14. The portable communication device of claim 13, wherein the RFIC is further configured to radiate the first beam and the second beam toward the second exterior side.

15. The portable communication device of claim 13, wherein the third signal corresponds to 39 GHz, and wherein the fourth signal corresponds to 28 GHz.

16. The portable communication device of claim 11, wherein the first antenna array comprises a plurality of patch antenna elements, and
wherein the third antenna array comprises a plurality of patch antenna elements.

17. The portable communication device of claim 11, wherein, when viewed from above the first antenna array, the second antenna array is located below the first antenna array.

18. The portable communication device of claim 13, wherein the RFIC is configured to:
responsive to being set in a first operation using the first frequency band, transmit the first signal to the first antenna array, and transmit the third signal to the third antenna array; and
responsive to being set in a second operation using the second frequency band, transmit the second signal to the second antenna array, and transmit the fourth signal to the fourth antenna array.

19. The portable communication device of claim 11, wherein the RFIC is disposed at the first PCB.

* * * * *